(12) United States Patent
Ishikawa

(10) Patent No.: US 7,298,909 B2
(45) Date of Patent: Nov. 20, 2007

(54) IMAGE PROCESSING METHOD AND IMAGE PROCESSING APPARATUS

(75) Inventor: Tomoe Ishikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 666 days.

(21) Appl. No.: 10/946,078

(22) Filed: Sep. 22, 2004

(65) Prior Publication Data

US 2005/0074174 A1    Apr. 7, 2005

(30) Foreign Application Priority Data

Oct. 1, 2003 (JP) ............................ 2003-343570
Sep. 16, 2004 (JP) ............................ 2004-269129

(51) Int. Cl.
  *G06K 9/36* (2006.01)
(52) U.S. Cl. .................... 382/232; 382/235
(58) Field of Classification Search ............ 382/232, 382/235; 345/555, 556; 368/10; 347/9
  See application file for complete search history.

(56) References Cited

U.S. PATENT DOCUMENTS 6,784,891 B2 *   8/2004   Inuzuka et al. ............. 345/555
6,992,676 B2 *   1/2006   Inuzuka et al. ............. 345/555

FOREIGN PATENT DOCUMENTS

JP    2000-50261    2/2000
JP    2002-49514    2/2002

* cited by examiner

*Primary Examiner*—Anh Hong Do
(74) *Attorney, Agent, or Firm*—Fitzpatrick, Cella, Harper & Scinto

(57) ABSTRACT

A transmission request for encoded data necessary to obtain a desired image is received (S801). It is determined whether the upper limit value of the data quantity of encoded data of a tile to be sent back in response to the transmission request is designated (S802). When the upper limit value is designated, encoded data of tiles to be sent back are referred to in a desired tile order. Of data of logical units which form the encoded data of a tile to be referred to, data of a logical unit corresponding to the transmission request and header data of the logical unit are output to a memory. The data size is counted in an output order, and a data group which is output until the counting result exceeds the upper limit value is sent back (S806 and S807).

13 Claims, 21 Drawing Sheets

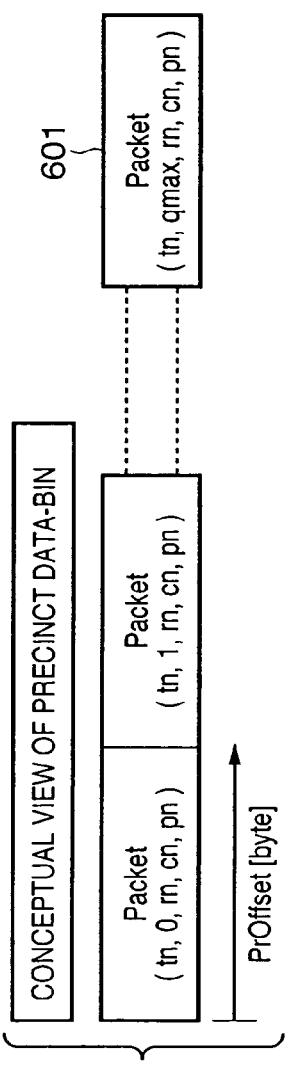
F I G. 6A
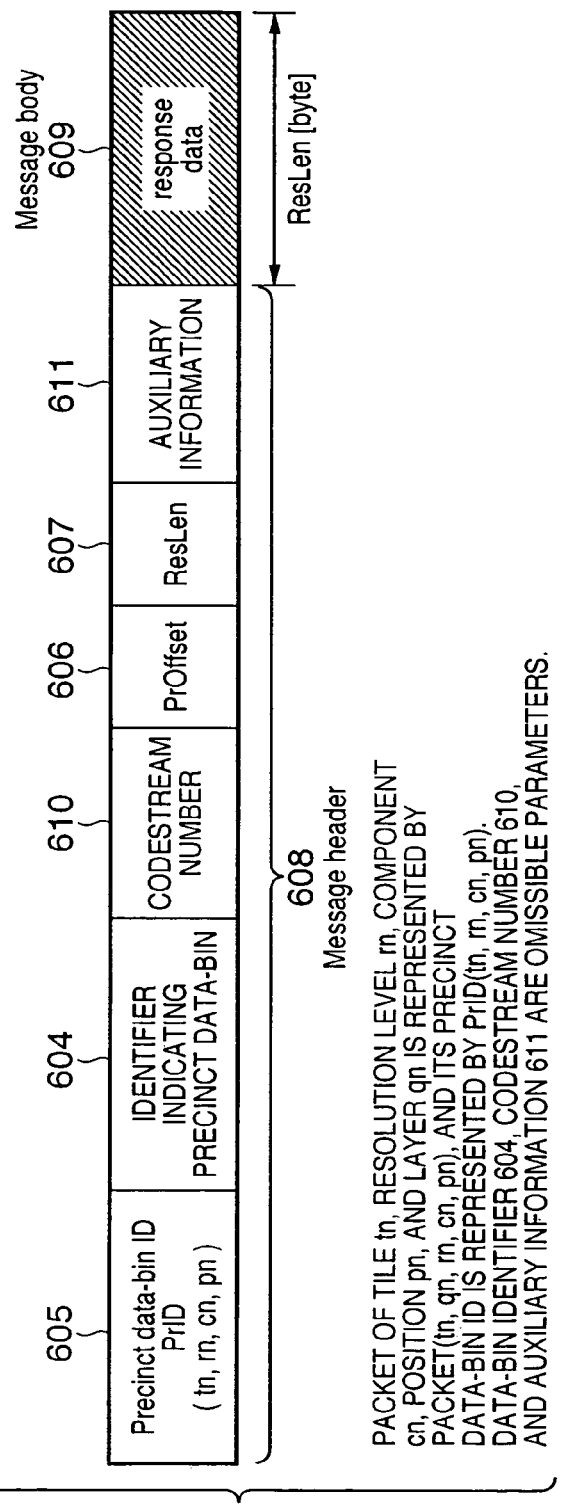
F I G. 6B

DATA LENGTH OF PACKET OF EACH COMPONENT [KBYTES]

| Layer \ Resolution | 0 | 1 | 2 |
|---|---|---|---|
| 0 | 0.2 | 0.4 | 0.8 |
| 1 | 0.2 | 0.6 | 1.2 |
| 2 | 0.2 | 0.8 | 1.6 |
| 3 | 0.4 | 1.0 | 2.0 |
| 4 | 0.4 | 1.2 | 2.4 |

LENGTH OF MESSAGE HEADER OF SEVERAL BYTES IS ALSO INCLUDED.

FIG. 16A

| 0 | 1 | 2 | 3 |
|---|---|---|---|
| 6 | 7 | 8 | 9 |
| 12 | 13 | 14 | 15 |

FIG. 16B

| 0 | 1 | 2 | 3 |
|---|---|---|---|
| 6 | 7 | 8 | 9 |
| 12 | 13 | 14 | 15 |

FIG. 16C

| 0 | 1 | 2 | 3 |
|---|---|---|---|
| 6 | 7 | 8 | 9 |
| 12 | 13 | 14 | 15 |

FIG. 16D

| 0 | 1 | 2 | 3 |
|---|---|---|---|
| 6 | 7 | 8 | 9 |
| 12 | 13 | 14 | 15 |

METADATA-ASSIGNED TILE

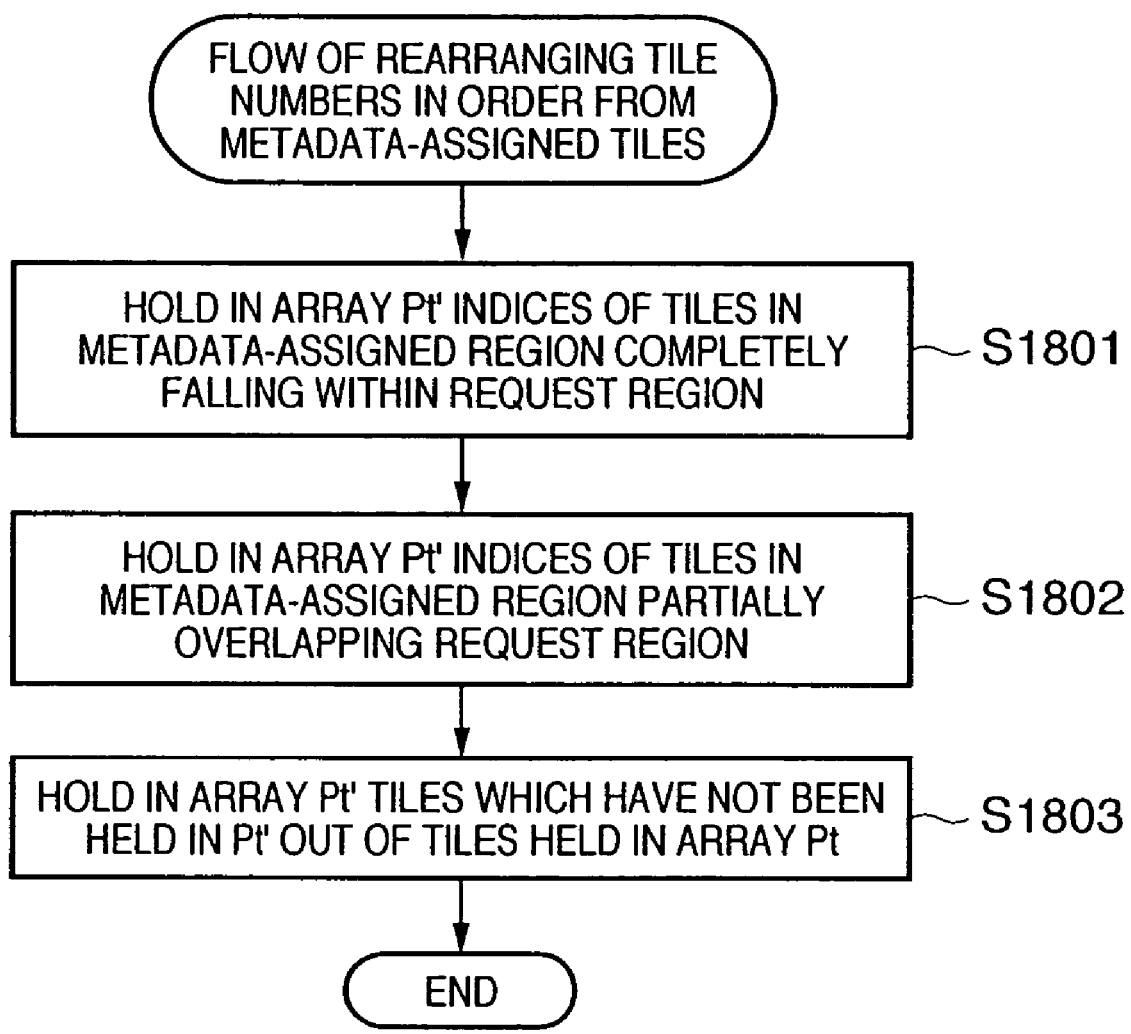

FIG. 19A

File name : image.jp2  ~1901

| TILE NUMBER | ACCESS COUNT |
|---|---|
| Tile 0 | 76 |
| Tile 1 | 152 |
| Tile 2 | 228 |
| Tile 3 | 228 |
| Tile 4 | 152 |
| Tile 5 | 76 |
| Tile 6 | 152 |
| ⋮ | ⋮ |
| Tile 29 | 125 |
| Tile 30 | 125 |
| Tile 31 | 157 |
| Tile 32 | 356 |
| Tile 33 | 356 |
| Tile 34 | 157 |
| Tile 35 | 121 |

FIG. 19B

| 0 (76) | 1 (152) | 2 (228) | 3 (228) |
|---|---|---|---|
| 6 (152) | 7 (304) | 8 (456) | 9 (456) |
| 12 (152) | 13 (304) | 14 (456) | 15 (456) |

TILE NUMBER (ACCESS COUNT)

FIG. 21

| Resolution / Layer | 0 | 1 | 2 |
|---|---|---|---|
| 0 | | | |
| 1 | | 12 tiles 3 components | |
| 2 | | | |
| 3 | | | |
| 4 | | 12 tiles 3 components | 2 tiles 3 components |

IMAGE PROCESSING METHOD AND IMAGE PROCESSING APPARATUS

FIELD OF THE INVENTION

The present invention relates to a technique for transmitting/receiving, via a network, encoded image data, which is segmented into tiles each including a plurality of logic units and has a format that allows a plurality of types of different orders of logical units to be arranged.

BACKGROUND OF THE INVENTION

On the Internet, users actively access WWW servers from Web browsers, which are running on client terminals, to browse document data, image data, and the like on the client terminal side via the Web browsers. Each WWW server saves a document called a home page, which is prepared by describing information to be disclosed in HTML. The Web browser on the client terminal side accesses such home page and displays it on the display screen of a display device of the client terminal. Also, when the user designates a link in the home page displayed on the display device, the Web browser on the client terminal side can acquire required information by tracing a link destination indicated by the link.

Furthermore, as a method of downloading files managed by the WWW server, a method called "File Transfer Protocol" (to be abbreviated as "FTP" hereinafter) is known. The FTP is a scheme for transferring the contents of a file on the WWW server to the client computer at a time via a network.

One of techniques for transferring the whole image file at a time is to control the order of transmission data on the server side (for example, see Japanese Patent Laid-Open No. 2000-50261). In this case, some regions are set as important regions on the server side, and pieces of information in these regions are encoded in order before the remaining pieces of region information. The client can determine on an early stage of transmission whether the current image is necessary or unnecessary, and can interrupt reception of the data in the middle of the operation.

As a protocol for fragmentarily accessing and displaying an image data file, Flashpix/IIP is known. This Internet imaging protocol (IIP) is optimal to the image data file format "Flashpix", and makes partial access to image data for respective tiles of Flashpix. Some conventional techniques that use this IIP protocol have been disclosed (for example, see Japanese Patent Laid-Open No. 2002-49514).

With any protocol, the client terminal cannot transmit to the server side a request to limit the size of response data.

As of June, 2003, JPEG2000 image coding system—Part 9: Interactivity tools, APIs and Protocols (to be abbreviated as JPIP hereinafter) has been examined as a protocol for fragmentarily accessing and displaying a JPEG2000 file. JPEG2000 and JPIP enable access to a partial region of an image and selection of the resolution, similar to Flashpix and IIP. Also, a change of the image quality, color/monochrome switching, and setting of the size limitation of response data can be easily achieved in accordance with client requests. When JPEG2000 image data is fragmentarily transmitted using JPIP, the client must cache received fragmentary encoded data so as to decode the image. This is because encoded data of each JPEG2000 layer/level is difference data from data one layer/level lower than that layer/level.

According to the technique of setting a predetermined region as an important region on the server side, like Japanese Patent Laid-Open No. 2000-50261, the server must set and encode again an important region every time the server receives a request. Thus, the server cannot cope with various requests (e.g., a request of a partial region of an image and requests to switch the resolution, image quality, and color/monochrome) from the client using interactive image communication protocols such as IIP and JPIP.

When the response data size receivable or cacheable on the client side is limited, the client may stop reception of data by the limited size. If the server transmits data in a preset transmission order without considering the size limitation of reception data on the client side, the client may display only some of requested regions at a high definition upon decoding the received data, and may not display the remaining data. Alternatively, the client may display only some of display regions at a very high definition, and display adjacent regions unnaturally at a very low resolution.

SUMMARY OF THE INVENTION

The present invention has been made in consideration of the aforementioned problems, and has as its object to provide a technique for designating the upper limit value of the data size of encoded data necessary to obtain a desired image, and obtaining the encoded data.

In order to achieve an object of the present invention, for example, an image processing method of the present invention comprises the following arrangement.

That is, an image processing method executed by an image processing apparatus which holds encoded data of an image that is segmented into tiles each formed from a plurality of logical units and can take a plurality of logical unit arrangement orders as a format of the encoded data, and transmits, to an external apparatus, data of a logical unit corresponding to a request from the external apparatus in a tile corresponding to the request, comprises:

a reception step of receiving a transmission request for encoded data necessary to obtain a desired image;

a determination step of determining whether an upper limit value of a data quantity of encoded data of a tile to be transmitted to the external apparatus in response to the transmission request is designated by the external apparatus; and a transmission control step of deciding, in accordance with a determination result in the determination step, a portion to be transmitted to the external apparatus out of data of logical units which form encoded data of tiles to be transmitted to the external apparatus and header data of the logical units, and transmitting the decided portion to the external apparatus, the transmission control step comprising a first transmission step of, when no upper limit value is designated, transmitting, to the external apparatus, data of logical units which form the encoded data of the tiles to be transmitted to the external apparatus and header data of the logical units, an output step of, when the upper limit value is designated, referring in a desired tile order to the encoded data of the tiles to be transmitted to the external apparatus, and outputting data of a logical unit corresponding to the transmission request and header data of the logical unit, of data of logical units which form encoded data of a tile to be referred to, to a memory and a second transmission step of counting a size of data of logical units and a size of header data of the logical units in an output order in the output step, and transmitting, to the external apparatus, a data group of the logical units and a header data group of the logical units which are output to the memory until a counting result exceeds the upper limit value.

In order to achieve an object of the present invention, for example, an image processing apparatus of the present invention comprises the following arrangement.

That is, an image processing apparatus which holds encoded data of an image that is segmented into tiles each formed from a plurality of logical units and can take a plurality of logical unit arrangement orders as a format of the encoded data, and transmits, to an external apparatus, data of a logical unit corresponding to a request from the external apparatus in a tile corresponding to the request, comprises:

reception means for receiving a transmission request for encoded data necessary to obtain a desired image;

determination means for determining whether an upper limit value of a data quantity of encoded data of a tile to be transmitted to the external apparatus in response to the transmission request is designated by the external apparatus; and transmission control means for deciding, in accordance with a determination result of the determination means, a portion to be transmitted to the external apparatus out of data of logical units which form encoded data of tiles to be transmitted to the external apparatus and header data of the logical units, and transmitting the decided portion to the external apparatus, the transmission control means comprising first transmission means for, when no upper limit value is designated, transmitting, to the external apparatus, data of logical units which form the encoded data of the tiles to be transmitted to the external apparatus and header data of the logical units, output means for, when the upper limit value is designated, referring in a desired tile order to the encoded data of the tiles to be transmitted to the external apparatus, and outputting data of a logical unit corresponding to the transmission request and header data of the logical unit, of data of logical units which form encoded data of a tile to be referred to, to a memory and second transmission means for counting a size of data of logical units and a size of header data of the logical units in an output order of the output means, and transmitting, to the external apparatus, a data group of logical units and a header data group of the logical units which are output to the memory until a counting result exceeds the upper limit value.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing the basic arrangement of an image processing apparatus according to an embodiment of the present invention, which comprises a PC (personal computer), workstation, or the like;

FIG. 6A is a view showing the configuration of a set of JPEG2000 packet data called a precinct data-bin;

FIG. 6B is a view showing the configuration of JPIP response data formed using the precinct data-bin shown in FIG. 6A;

FIG. 16A is a view showing return tiles of resolution level 2 and layer 4 in transmitting tile data sequentially from an upper left tile in the request region;

FIG. 16B is a view showing return tiles of resolution level 2 and layer 4 in transmitting tile data by a method according to the first embodiment of the present invention;

FIG. 16C is a view showing return tiles of resolution level 2 and layer 4 in the second embodiment of the present invention;

FIG. 16D is a view showing return tiles of resolution level 2 and layer 4 in the fourth embodiment of the present invention;

FIG. 18 is a flowchart showing a tile index rearrangement process executed in step S1001 in the second embodiment of the present invention;

FIG. 19A is a table for managing the access count of each tile;

FIG. 19B is a view showing acquired access count data when the request region is a region 701 shown in FIG. 7;

FIG. 21 is a table showing the configuration of response data in the first embodiment of the present invention.

DETAILED DESCRIPTION OF THE PREFERRED EMBODIMENTS

Preferred embodiments of the present invention will now be described in detail in accordance with the accompanying drawings.

[First Embodiment]

Figure 1:
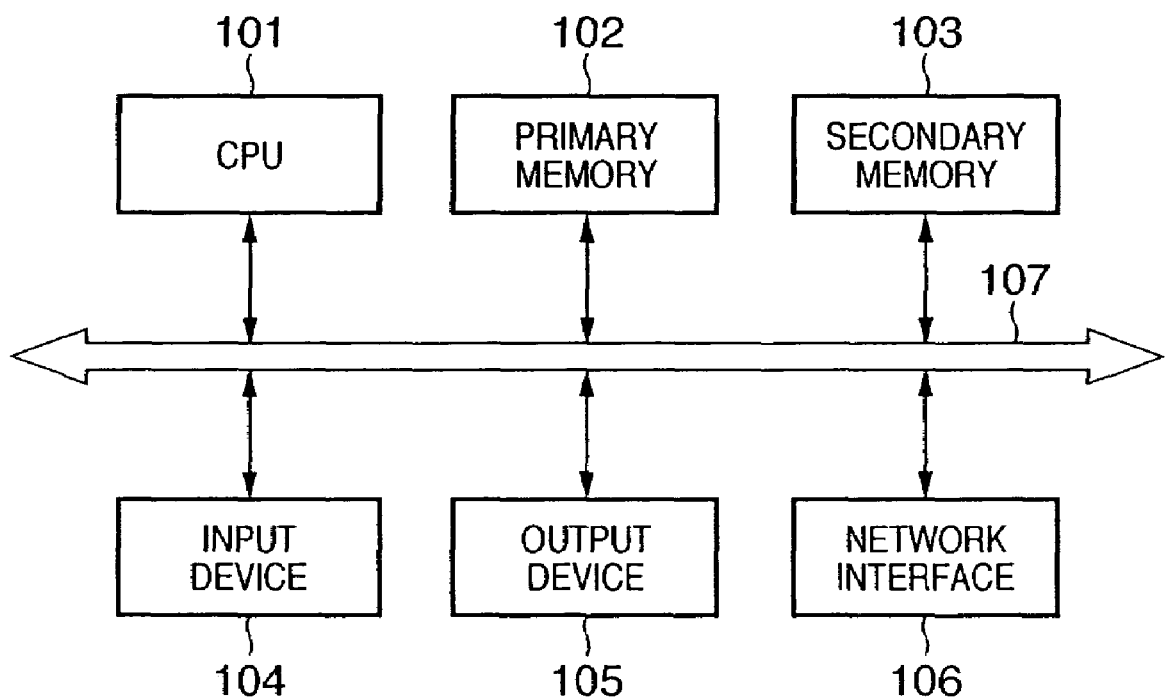

FIG. 1 is a block diagram showing the basic arrangement of an image processing apparatus according to the first embodiment, which comprises a PC (personal computer), workstation, or the like.

A CPU 101 controls the operation of the overall apparatus and the operations of respective units to be described later using programs and data loaded onto a primary memory 102.

The primary memory 102 is a main storage device represented by a RAM, and has an area for temporarily storing programs and data loaded from a secondary memory 103, and also an area used by the CPU 101 to execute various processes.

The secondary memory 103 is an information storage device which is represented by a hard disk drive and has a large storage capacity, and can save an OS (Operating System), and programs and data required for the CPU 101 to execute respective processes to be described later. The secondary memory 103 outputs (loads) a requested program and data to the primary memory 102 under the control of the CPU 101.

An input device 104 is an instruction input device represented by, e.g., a mouse, keyboard, and the like, and allows the user of this apparatus to input various instructions to the CPU 101.

An output device 105 is a device represented by, e.g., a display and printer, and can output an image processed by this apparatus in various formats such as display, printout, and the like.

A network interface (I/F) 106 serves as an I/F that makes data communications with an external apparatus. Reference numeral 107 denotes a bus that interconnects the aforementioned units. The image processing apparatus according to this embodiment adopts the basic arrangement shown in FIG. 1 for the sake of simplicity in the following description. However, other arrangements may be adopted, and the present invention is not limited to that shown in FIG. 1.

Figure 2:
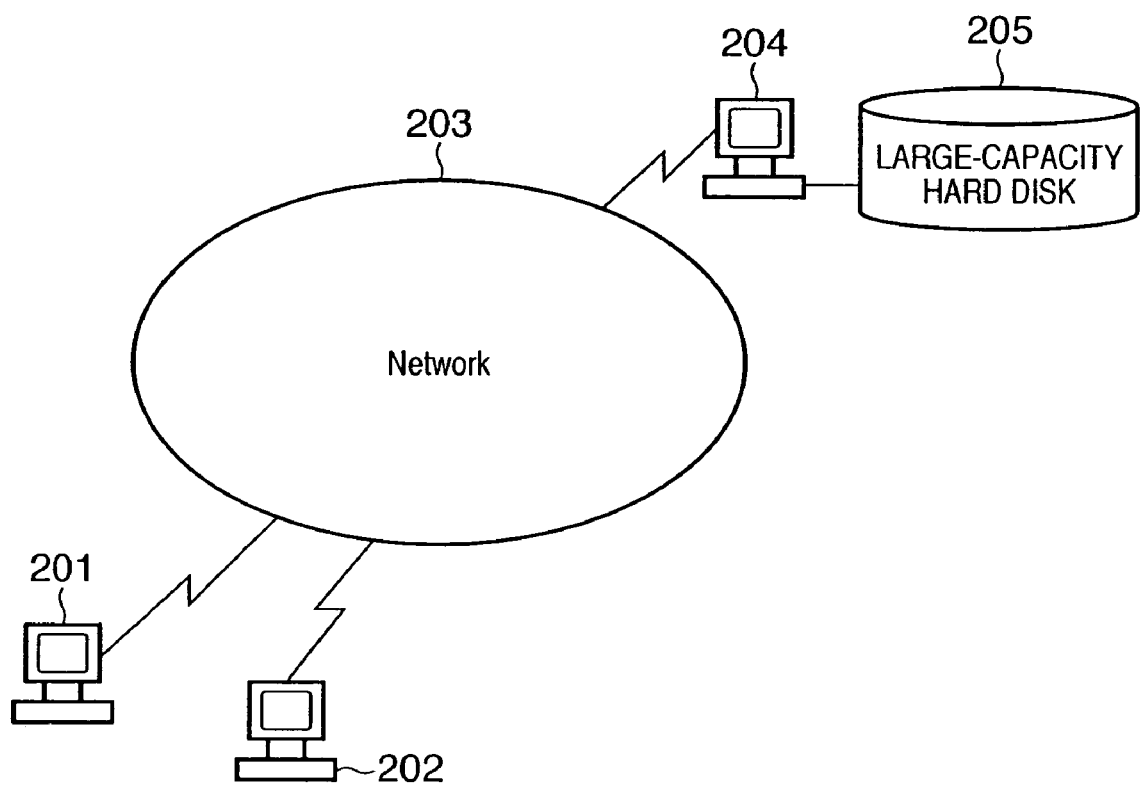
FIG. 2 is a schematic diagram showing a system including the image processing apparatus.

FIG. 2 is a schematic diagram of a system including the aforementioned image processing apparatus. Reference numerals 201 and 202 denote client terminals, which can make various data communications via a server 204 as the image processing apparatus and a network 203.

The network 203 includes wired and wireless networks such as the Internet, LAN, and the like.

The server 204 can make data communications with the client terminals 201 and 202 via the network 203, as described above. For example, upon reception of a request of a desired image from the client terminal 201 or 202, the server 204 reads out data corresponding to the request from a storage device 205 (corresponding to the secondary memory 103) that saves encoded image data in large quantities, and returns the data via the network 203. The storage device 205 corresponds to, e.g., a hard disk drive device or a device for reading programs and data from storage media such as a CD-ROM, DVD-ROM, and the like.

In the first embodiment, the storage device 205 saves a plurality of image data encoded by an encoding method according to JPEG2000. Therefore, the client terminal 201 or 202 requests the server 204 to send only data required to obtain a desired image of desired encoded image data from those saved in the storage device 205.

A process executed when the server 204 transmits encoded image data requested by the client terminal to that client terminal will be described below. In order to download an image saved in the storage device 205, the client terminal must access the server 204 using a Web browser. In response to this access, the server 204 presents some or all images saved in the storage device 205 to the client terminal in the form of thumbnails. In this way, the Web browser displays these images.

When the user of the client terminal designates a desired image from the image group displayed on the Web browser using an input device such as a mouse, keyboard, or the like, the client terminal transmits a transmission request of fragmentary data of the desired image data to the server 204 using a JPIP scheme in accordance with the image size and resolution that meet conditions (screen size, display format, and the like).

At this time, according to the first embodiment, the client terminal can request the server 204 to limit the size of requested data to a predetermined value (upper limit value) or less in accordance with the current free area of the memory of the client terminal, the circuit capacity of the network 203, and the like. More specifically, the client terminal can request the server 204 to send data necessary to obtain a desired image, and to limit the size of data transmitted by the server 204 to a predetermined quantity or less.

The upper limit value designation method is not particularly limited. For example, the client terminal may designate the upper limit value using a keyboard or mouse. The client terminal may specify and use an upper limit value corresponding to the performance of a modem or the like currently used by the client terminal from a table which holds upper limit values corresponding to various data transfer rates.

Since the server 204 transmits fragmentary data according to this request to the client terminal, the client terminal receives this data, and caches it in a buffer.

Upon displaying the received image, the client terminal generates a bitstream complying with the JPEG2000 syntax from the cached data, and decodes and displays that bitstream. In addition to this, the decoded image can be output to a printer, copying machine, or the like (not shown), and printed out.

Figure 3:
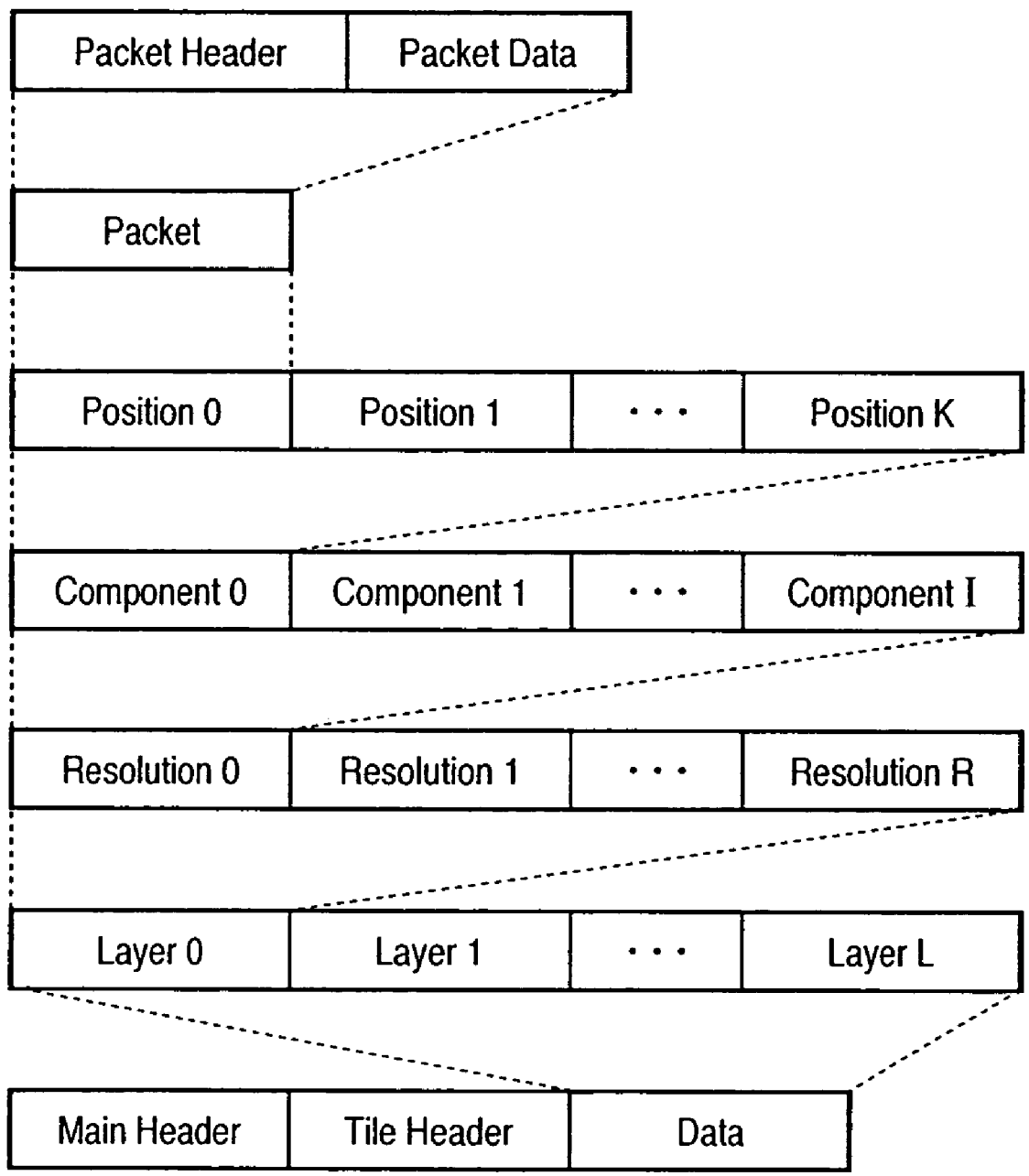
FIG. 3 is a view showing the configuration of a JPEG2000 bitstream according to Layer-resolution level-component-position progression.

A general JPEG2000 bitstream will be explained below. FIG. 3 shows the configuration of a JPEG2000 bitstream according to Layer-resolution level-component-position progression (to be abbreviated as LRCP hereinafter). The JPEG2000 bitstream includes a main header, tile header, and data, and this data field records encoded image data. The tile header is generated for compression-encoded data of each tile when a compression-encoding source image is segmented into rectangles (tiles) each having a predetermined size, and compression-encoded data of respective tiles are generated. Since the main header and tile header are based on the state-of-the-art technique, a description thereof will be omitted.

According to the LRCP, encoded image data (a field indicated by "Data" in FIG. 3) has a configuration in which data are allocated in the order of Layer/Resolution/Component/Position. Such configuration is called a progression order. "Position" means "precinct" in JPEG2000 encoded data.

The JPEG2000 encoded data can be divided into data for respective Layers. Data of respective Layers are bitplane encoded data generated by known bitplane encoding, and are allocated in turn from a bitplane (Layer0) on the MSB side to that (LayerL) on the LSB side. Each Layer number corresponds to an S/N ratio of an image to be reclaimed by an original image, and the S/N ratio impairs (lowers) with decreasing Layer number. That is, in the JPEG2000 data shown in FIG. 3, data of respective Layers are allocated in ascending order of S/N ratio.

Figure 4:
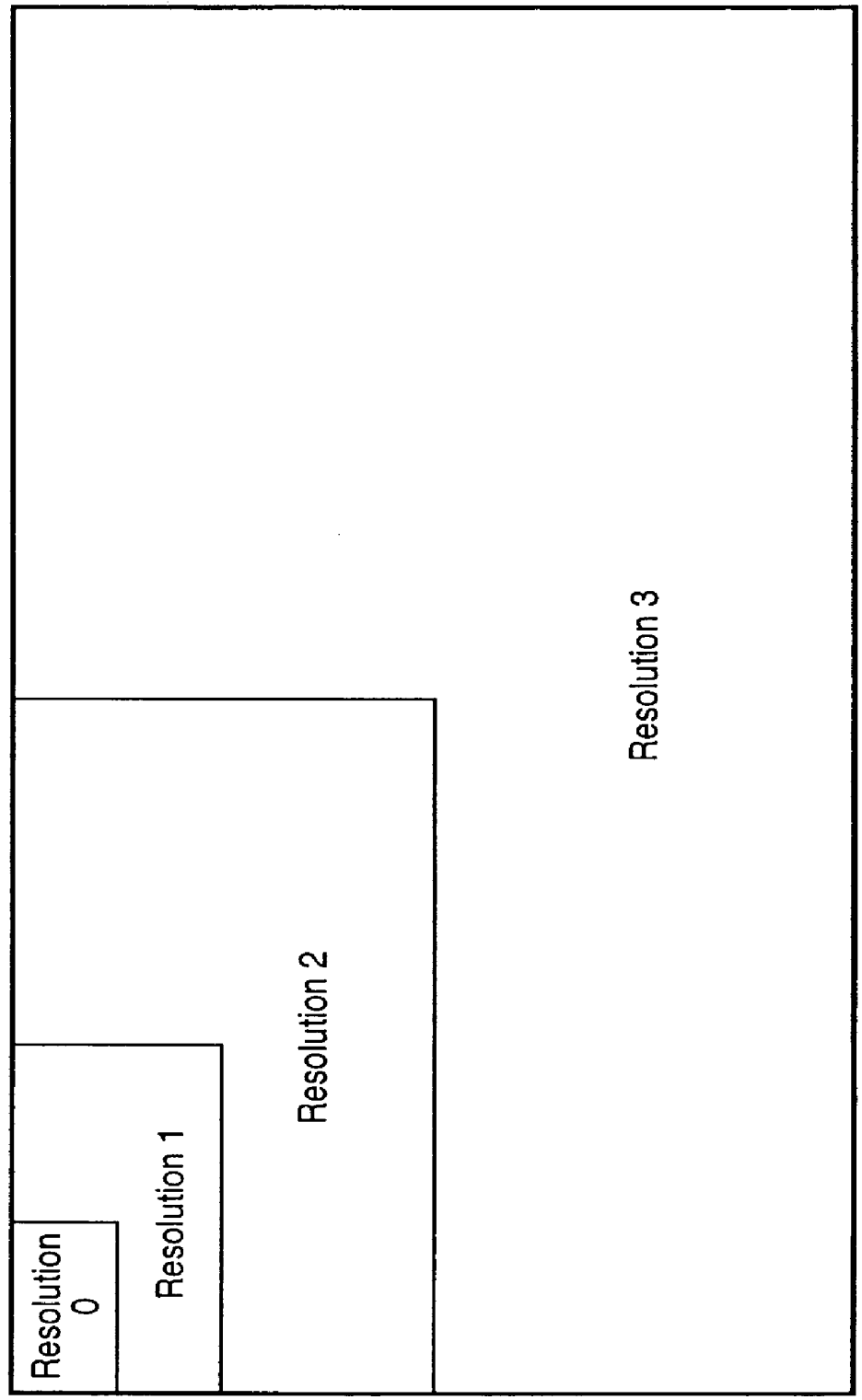
FIG. 4 is a view showing the relationship between the resolutions and Resolution numbers.

Furthermore, data of each Layer is made up of data of respective Resolutions. Data of respective resolutions are allocated in an order based on Resolution numbers according to the resolutions (image sizes). FIG. 4 shows the relationship between the resolutions and Resolution numbers. The Resolution number of an image with the lowest resolution is set to be "0", and the width and height of the image size are doubled as the Resolution number increases by one. Each Layer stores data in ascending order of Resolution number.

Referring back to FIG. 3, data of each Resolution includes data of respective Components. Data of respective Components correspond to color data of an image. For example, when an image is formed of R, G, and B component data, data of Component0 is data of the R component, data of Component1 is data of the G component, and data of Component2 is data of the B component. That is, the number of Components matches the number of dimensions of the color space of an image.

Each Component data records data of spatial positions (Position data) in the compression encoding source image in turn, and respective Position data are assigned numbers (position numbers) according to their spatial order (for example, the upper left corner of an image has a number "0", and the number is incremented one by one to the right of the image; when the right end is reached, the number is incremented from the left end of the next row to the right of the image).

In one JPEG2000 file, the maximum values of the Resolution number, Layer number, Component number, and position number are set in advance by an encoder, the compression encoding source image is encoded according to these parameters, and that information is recorded in the main header. Each packet includes a packet header field that manages information of code-blocks stored in that packet, and encoded data of the code-blocks. In FIG. 3, one Position data corresponds to a packet. This "packet" is a kind of logical unit.

When a JPEG2000 file with such structure is held by the server, the server can supply only encoded data according to the resolution or the like requested by the client terminal to that client terminal. In the first embodiment, since data are transmitted/received according to JPIP, tiles or packets of JPEG2000 may be used as units of data to be supplied. This embodiment assumes packets as data units which are to be received by the client terminal from the server.

Figure 5:
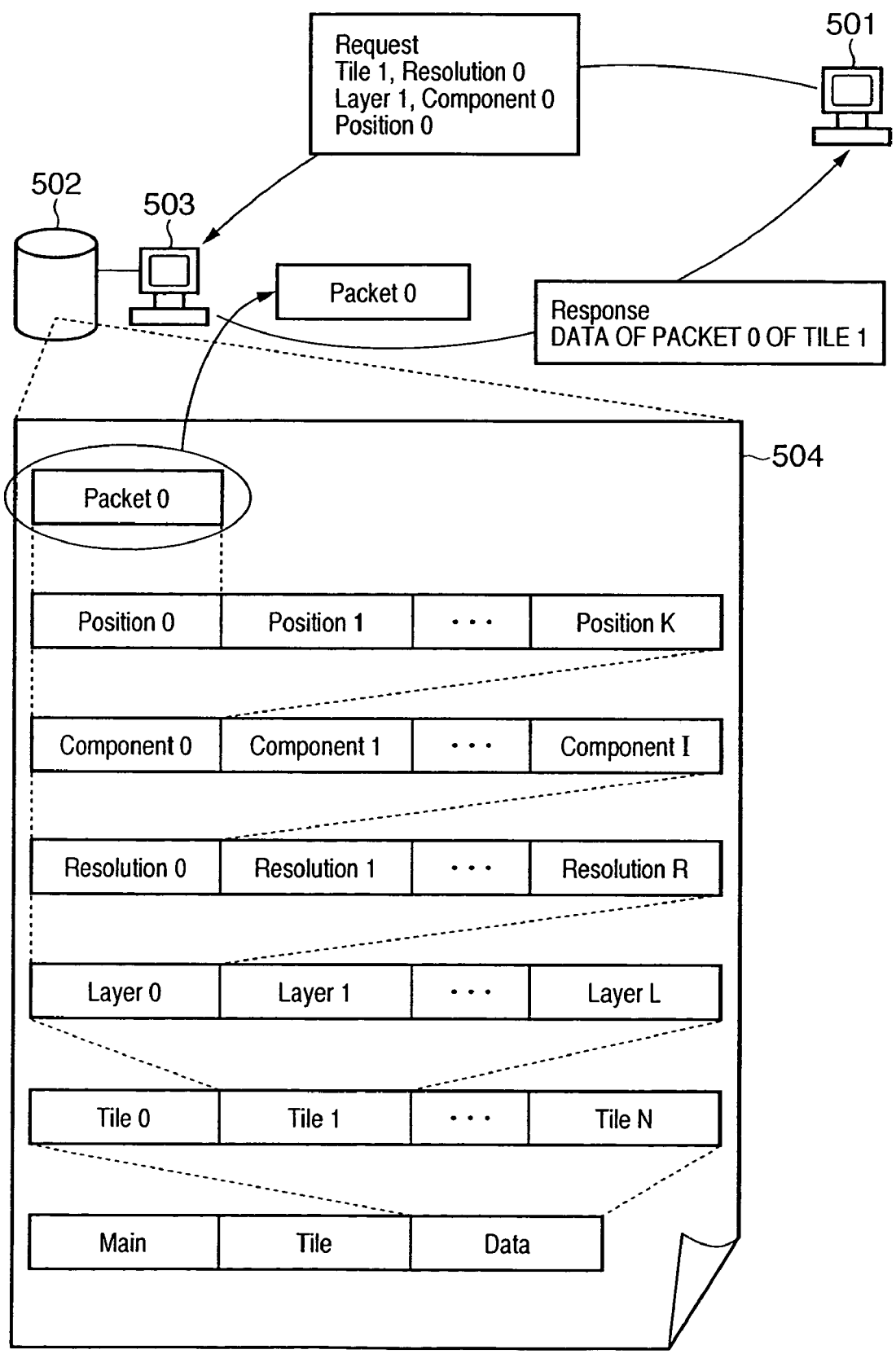
FIG. 5 is a conceptual view showing a request and response for respective packets.

FIG. 5 is a view for explaining the concept of a request and response for each packet. FIG. 5 shows requests and responses between a server 503 and a client terminal 501.

FIG. 5 shows communications between the server 503 and the client terminal 501 when the client terminal 501 requests to send encoded data of a desired tile, resolution, layer, component, and spatial position, in a state wherein an image is segmented into tiles, and encoded data (data of Tile0 to TileN in FIG. 5) of respective tiles are stored as JPEG2000 bitstreams 504 in a storage device 502 connected to the server 503.

For example, when the client terminal 501 requests the server 503 to send encoded data with a tile number "1", resolution number "0", layer number "0", component number non "0", and position number "0", the server 503 analyzes the JPEG2000 bitstreams 504 saved in the storage device 502, extracts a portion corresponding to the request (i.e., a portion corresponding to the requested tile number, resolution number, layer number, component number, and position number), i.e., packet 0 of tile number 1 as response data, and sends it back to the client terminal 501.

As described above, in the first embodiment, JPIP is used upon exchanging image data between the server and the client terminal, and encoded image data is transmitted from the server to the client terminal for respective packets.

The configuration of response data upon exchanging data using JPIP will be described below. FIG. 6A shows the configuration of a set of JPEG2000 packet data called a precinct data-bin. In JPIP, response data is generated on the basis of a set of JPEG2000 packet data called a precinct data-bin, as indicated by 601. The precinct data-bin is a set of data formed by arranging and joining packets of all layers which form resolution level rn and component number cn of precinct pn in Tile Tn in ascending order of layer number.

JPIP response data is generated using this precinct data-bin. FIG. 6B shows the configuration of the JPIP response data generated using the precinct data-bin shown in FIG. 6A. The JPIP response data includes a message header 608 and message body 609. The message body 609 stores, as response data, data of one or a plurality of packets (Packet (tn, rn, cn, pn, q) shown in FIG. 6A) extracted from the precinct data-bin 601 according to the requested tile and resolution.

The message header 608 includes fields for storing six parameters. A parameter stored in a first field 605 is a precinct data-bin ID (PrID) corresponding to the precinct data-bin (that shown in FIG. 6A) to which packet data in the message body 609 belongs. This PrID is uniquely determined by tile number tn, resolution level number rn, component number cn, and precinct number pn, and can be calculated by:

$$PrID(tn, rn, cn, pn)=tn+(cn+s\times(\text{number of components})\times\text{number of tiles}$$

for s=pn+tn×(number of precincts per tile in resolution level rn)+(sum total of numbers of precincts of tile tn from resolution level 0 to (rn−1))

A parameter stored in a second field 604 is an identifier which indicates that data stored in the message body 609 is the precinct data-bin.

A parameter stored in a third field 610 is a codestream number which indicates a codestream from which data in the message body 609 is extracted.

A parameter stored in a fourth field 606 is an offset value PrOffset (see FIG. 6A) which indicates an offset of the position of each packet data (data for one packet if only one packet is stored) in the message body 609 from the head of the precinct data-bin.

A parameter stored in a fifth field 607 is a byte length ResLen [byte] (see FIG. 6B) of the response data, i.e., the message body 609.

A parameter stored in a sixth field 611 is auxiliary information for data in the message body 609. The fields 604, 610, and 611 hold omissible parameters.

The process executed when the image processing apparatus according to the first embodiment as the server generates and transmits such JPIP response data (to be also simply referred to as response data hereinafter) to a transmission request source device (to be referred to as a client terminal hereinafter) will be described below. Note that the image processing apparatus according to this embodiment will be referred to as a server in terms of its functions.

In the first embodiment, encoding conditions for an image managed by the server 204 (saved in the storage device 205) are as follows.

Number of resolution levels: 3 (resolution levels 0 to 2)
Number of layers: 5 (layers 0 to 4)
Number of components: 3 (components 0 to 2)
Number of tiles: 6×6=36 (tiles 0 to 35)
Number of positions: 1 position/1 tile
Image size at resolution level 2: 768×768 [pixels]
Tile size at resolution level 2: 128×128 [pixels].

The server 204 holds image data encoded under the above encoding conditions in the secondary memory 103, and reads out the data to the primary memory 102, as needed. As is known well, information representing these encoding conditions is added as header information to encoded data. The encoding conditions of encoded data can be obtained by referring to the header information.

Figure 7:
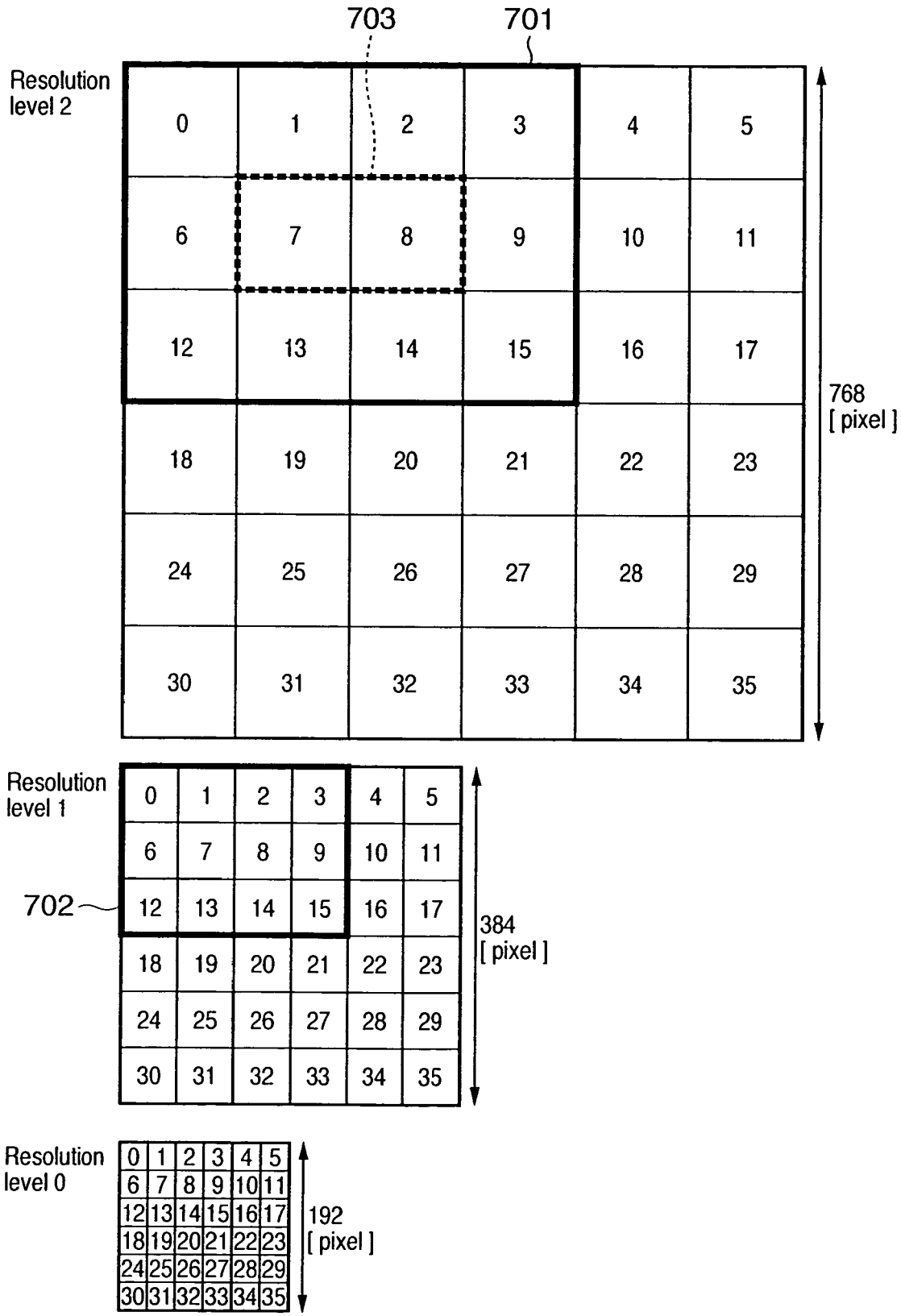
FIG. 7 is a view showing the relationship between the tile and resolution of an image represented by encoded data held by a server 204.

FIG. 7 is a view showing the relationship between the tile and resolution of an image represented by encoded data held by the server 204. In the first embodiment, since one tile corresponds to one position, the position is not illustrated in FIG. 7.

As described above, the server 204 holds encoded data of resolution levels 0 to 2 for one image. An image at each resolution level is segmented into a plurality of tiles (36 tiles in FIG. 7). In FIG. 7, tiles are assigned numbers, which are indices unique to the respective tiles.

For descriptive convenience, the client terminal downloads, of encoded data as a set of encoded data of images at respective resolution levels shown in FIG. 7, data necessary to display an entire image in all color components at resolution level 0 and layer 4 from the server 204, and caches the downloaded data.

Assume that the client terminal transmits to the server 204 an encoded data transmission request to display the upper left region of an image at resolution level 2 and layer 4 in all color components. In the first embodiment, together with the transmission request, the client terminal can transmit to the server 204 data for instructing the server 204 to transmit response data so as to limit the upper limit value of the total data size of JPIP response data serving as response data (data to be sent back from the server 204 in accordance with the transmission request), i.e., the upper limit value of the total data size of the message header 608 and message body 609 to 360 k [bytes].

That is, assume that the client terminal requests response data prepared by limiting data of regions 701 and 702 in FIG. 7 to 360 k [bytes]. In the first embodiment, the client terminal transmits the following character string which indicates the transmission request and designation of the upper limit value of the data size of response data:

GET target=image.jp2 & fsiz=768,768 & roff=0,0 & rsiz=512,384 & type=jpp-stream & align=yes & len=360000 & need=r1, r2

In this character string, "image.jp2" indicates the name (file name) of encoded image data which is requested by the client terminal to be transmitted from the server 204, and "fsiz=768,768" indicates that the encoded data which is requested to be transmitted from the server 204 has an upper limit value "2" of the resolution level (see FIG. 7). That is, the resolution level 0, 1 and 2 are requested.

"roff=0,0 & rsiz=512,384" indicates that the encoded data which is requested to be transmitted from the server 204 is encoded data of a region (region 701 in FIG. 7) having a coordinate value (0,0) at the upper left corner and a size of 512×384 in the image at the resolution level 2. Since the resolution level 0, 1 and 2 are requested, as described above, data of regions in the image at resolution level 0 and 1 corresponding to the region 701 (e.g., region 702 for resolution level 1) are also subjected to the transmission request.

"type=jpp-stream & align=yes" indicates a request for response data of respective packets, and "len=360000" indicates that the upper limit value of the data size of response data is 360 k [bytes].

"need=r1, r2" indicates that data other than acquired data of resolution level 0 are requested.

The client terminal transmits the above character string as request data to the server 204. The server 204 interprets the request data, and sends back requested encoded data of the designated number of bytes or less to the client terminal.

A process executed by the server 204 upon reception of the request data will be explained in more detail.

Figure 8:
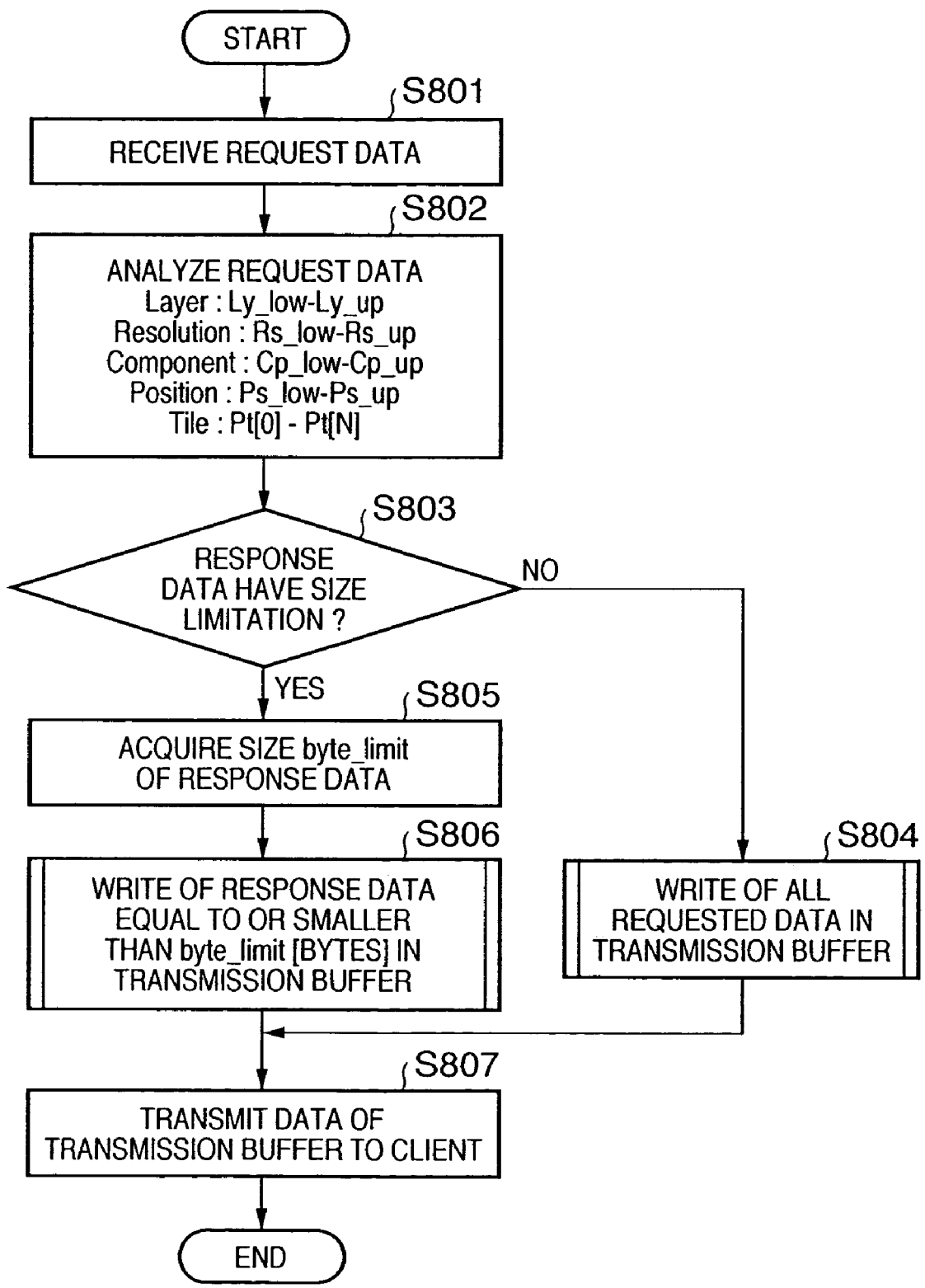
FIG. 8 is a flowchart showing a main process executed when the server 204 receives request data from a client terminal.

FIG. 8 is a flowchart showing a main process executed when the server 204 receives the above-mentioned request data from the client terminal. A program shown in the flowchart of FIG. 8 is saved in the secondary memory 103, and loaded to the primary memory 102. When the program is executed by the CPU 101, the server 204 realizes processes to be described later.

In step S801, the server 204 receives request data transmitted from the client terminal. The received request data is temporarily stored in the primary memory 102.

In step S802, the server 204 interprets the request data received in step S801, and specifies requested layer, resolution level, component, position, and tile ranges. Let Ly_low, Ly_up, Rs_low, Rs_up, Cp_low, Cp_up, Ps_low, and Ps_up be the minimum and maximum values of the requested layer, resolution level, component, and position ranges, and N be the number of tiles falling within the requested range. In the first embodiment, values represented by the respective variables are Ly_low=0, Ly_up=4
Rs_low=0, Rs_up=2
Cp_low=0, Cp_up=2
Ps_low=0, Ps_up=0
N=12

As described above, the client terminal requests the server 204 to send encoded data to be displayed in all color components at resolution level 2 and layer 4. The layer range of the transmission request includes layers 0 to 4, the resolution level range of the transmission request includes resolution levels 0 to 2, the component range of the transmission request includes components 0 to 2, and the position range of the transmission request includes only position 0.

In order to specify the number N of tiles, the server 204 can refer to the description "roff=x1,y1 & rsiz=x2,y2" of the request data, specify a minimum "region of tiles" which contains a region having a coordinate value (x1,y1) at the upper left corner and a coordinate value (x1+x2,y1+y2) at the lower right corner, and count the number of tiles in the specified region. In the first embodiment, the minimum region of tiles containing the target region is the region 701. In the first embodiment, since encoded data corresponding to the region 701 is requested from encoded image data of resolution level 2 in the image shown in FIG. 7, encoded data of 12 tiles with indices of 0, 1, 2, 3, 6, 7, 8, 9, 12, 13, 14, and 15 is requested. Hence, the variable N=12.

In the process of step S802 and processes to be described later, data representing the obtained result can be temporarily stored in the primary memory 102 and used for subsequent processes.

The indices of requested tiles are held in a one-dimensional array Pt in ascending order. The array Pt is Pt[0]=0, Pt[1]=1, Pt[2]=2, Pt[3]=3
Pt[4]=6, Pt[5]=7, Pt[6]=8, Pt[7]=9
Pt[8]=12, Pt[9]=13, Pt[10]=14, Pt[11]=15.

In step S803, the server 204 determines whether response data has a size limitation. In the first embodiment, the server 204 analyzes a text in the request data to check whether the text includes the description "len=". If the description "len=" exists, the server 204 determines that the response data has a size limitation. If the description "len=" does not exist as a result of analysis, the process advances to step S804. In step S804, of all data which are requested by the client terminal of the server 204, i.e., encoded data which are specified by "image.jp2" and contain tiles with indices of 0, 1, 2, 3, 6, 7, 8, 9, 12, 13, 14, and 15, encoded data of regions corresponding to layers 1 to 4, resolution level 0, components 0 to 2, and position 0, and encoded data of regions corresponding to layers 0 to 4, resolution levels 1 and 2, components 0 to 2, and position 0 are written as response data in a transmission buffer defined in the primary memory 102. Details of the process in step S804 will be described later with reference to FIG. 9.

If the description "len=" exists, the process advances to step S805. In the first embodiment, since "len=360000" exists, the server 204 determines that the response data has a size limitation.

In step S805, the server 204 acquires the upper limit value (byte_limit) of the response data size from the request data. In the first embodiment, byte_limit=360 k [bytes] from the description "len=360000".

In step S806, the server 204 writes data as response data in the transmission buffer up to an upper limit value equal to or smaller than byte_limit [bytes] acquired in step S805, out of all data which are requested by the client terminal of the server 204. Details of the process in step S806 will be described later with reference to FIG. 10.

In step S807, the server 204 transmits the response data written in the transmission buffer to the client terminal.

Figure 9:
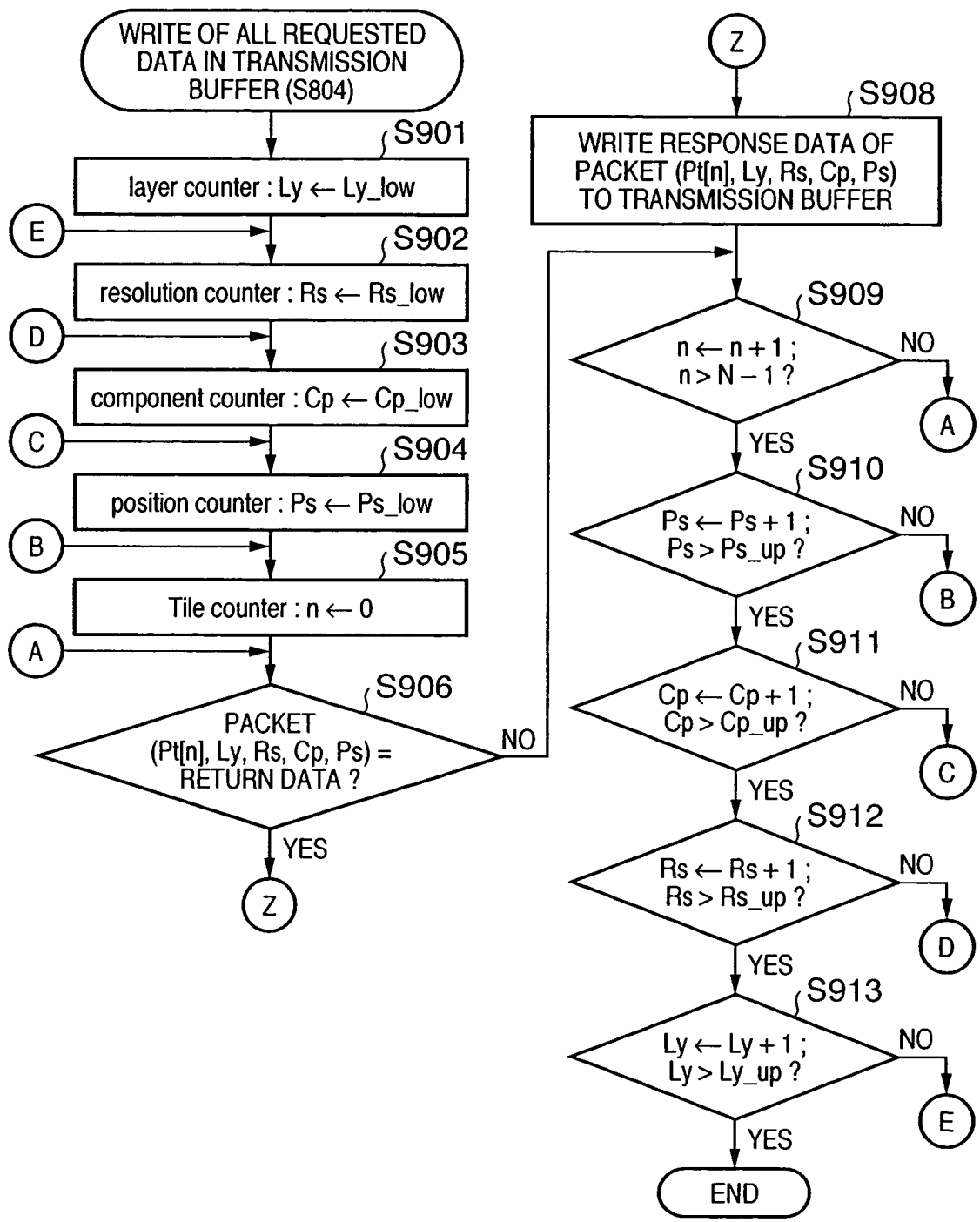
FIG. 9 is a flowchart showing details of a process in step S804 executed by the server 204 when no size limitation is designated for response data.

Details of the process in step S804 executed by the server 204 when response data is free from any size limitation will be explained with reference to FIG. 9 showing the flowchart of this process.

In step S901, the minimum layer number Ly_low of return data that is acquired in step S802 is substituted into a layer counter variable Ly utilized to generate response data.

In step S902, the minimum resolution level number Rs_low of the return data that is acquired in step S802 is substituted into a resolution level counter variable Rs utilized to generate response data.

In step S903, the minimum component number Cp_low of the return data that is acquired in step S802 is substituted into a component number counter variable Cp utilized to generate response data.

In step S904, the minimum position number Ps_low of the return data that is acquired in step S802 is substituted into a position counter variable Ps utilized to generate response data.

In step S905, "0" is substituted into a counter variable n which is utilized to generate response data and set for the number of an array for holding the indices of the return tiles, and initializes the counter variable n.

It is determined in step S906 whether packet data Packet (Pt[n], Ly, Rs, Cp, Ps) specified by the layer number Ly, resolution level number Rs, component number Cp, and position number Ps of the tile Pt[n] is data to be sent back.

If YES in step S906, the process advances to step S908; if NO, to step S909. In the first embodiment, when the process in step S906 is executed for the first time, Packet (Pt[0]=0, Ly=0, Rs=0, Cp=0, Ps=0) is a determination target. However, the request data contains the description "need=r1, r2", and this description requests data other than acquired data of resolution level 0, as described above. Thus, Packet (Pt[0]=0, Ly=0, Rs=0, Cp=0, Ps=0) is determined not to be return data, and the process advances to step S909.

When the counter is incremented to Packet (Pt[0]=0, Ly=0, Rs=1, Cp=0, Ps=0), it is interpreted from the description "need=r1, r2" that this packet has not been acquired by the client terminal and is requested data. In step S906, the packet is determined to be return data, and the process advances to step S908.

In step S908, data of Packet (Pt[n], Ly, Rs, Cp, Ps) is read out to the transmission buffer, and JPIP response data as shown in FIG. 6B is generated.

In step S909, the value n as the counter variable of the array Pt is incremented by one. The incremented variable n is compared with a value (N−1) obtained by subtracting one from the number N of return tiles. If the variable n is larger than (N−1), the process advances to step S910; if the variable n is equal to or smaller than (N−1), to step S906.

In step S910, the value of the position counter variable Ps is incremented by one, and compared with the maximum position number Ps_up acquired in step S802. If the value Ps becomes larger than Ps_up as a result of increment, the process advances to step S911; if the value Ps is equal to or smaller than Ps_up, the process returns to step S905.

In the first embodiment, since Ps_up=0, the value Ps always exceeds Ps_up upon increment in step S910, and the process always advances to step S911.

In step S911, the component counter variable Cp is incremented by one, and compared with the maximum value Cp_up of the return component number that is acquired in step S802. If Cp is equal to or smaller than Cp_up as a result of comparison, the process returns to step S904; if Cp is larger than Cp_up, the process advances to step S912.

In step S912, the resolution level counter Rs is incremented by one, and compared with the maximum number Rs_up of the return resolution level number that is acquired in step S802. If Rs is equal to or smaller than Rs_up as a result of comparison, the process returns to step S903; if Rs is larger than Rs_up, the process advances to step S913.

In step S913, the layer counter variable Ly is incremented by one, and compared with the maximum number Ly_up of the return layer number that is acquired in step S802. If Ly is equal to or smaller than Ly_up as a result of comparison, the process returns to step S902; if Ly is larger than Ly_up, the server 204 determines that all encoded data requested by the client terminal have been read out to the transmission buffer. The process of FIG. 9 ends, and the process advances to step S807.

Figure 10:
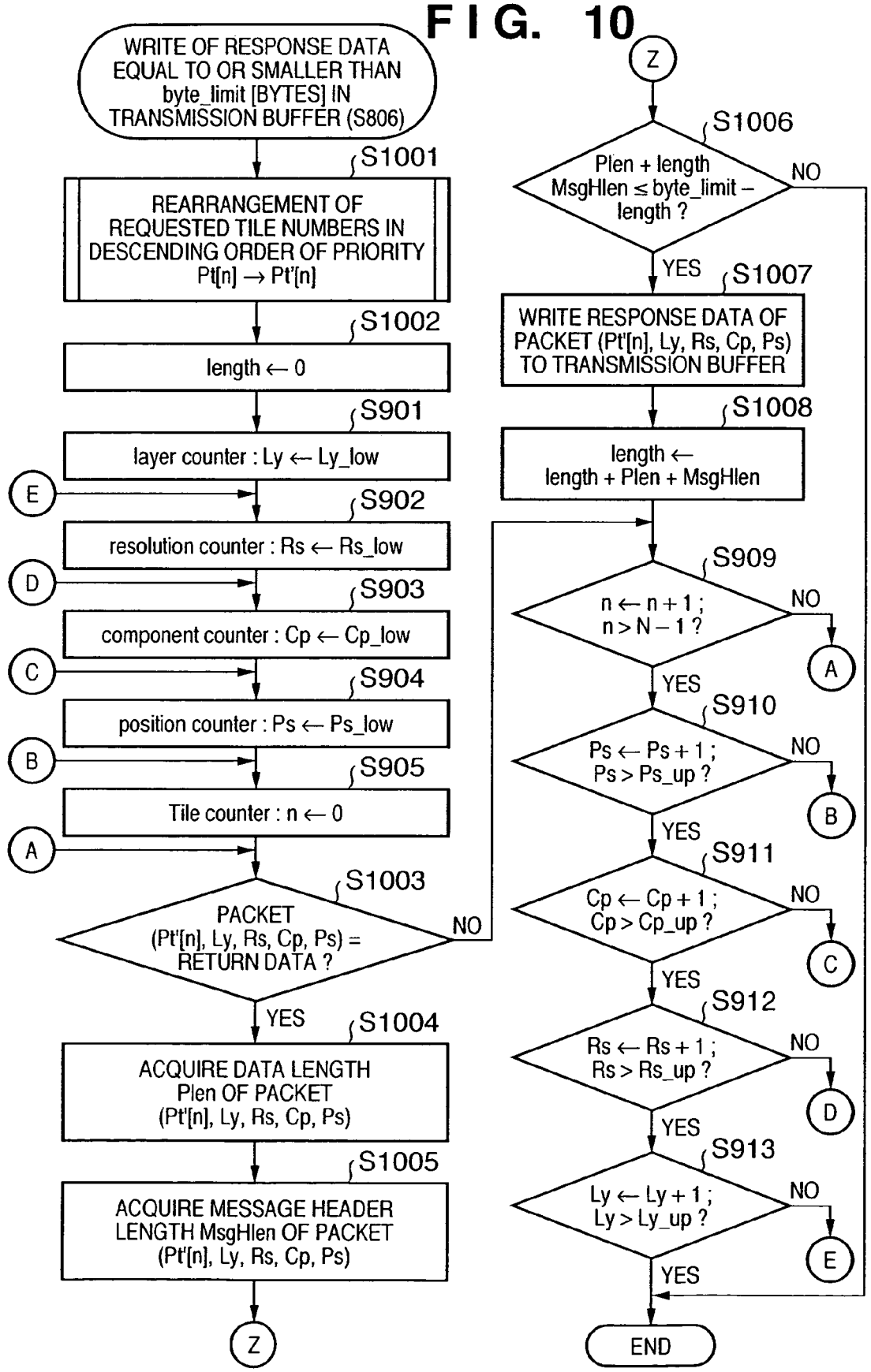
FIG. 10 is a flowchart showing details of a process in step S806 executed by the server 204 when a size limitation is designated for response data.

Details of the process in step S806 executed by the server 204 when response data has a size limitation will be explained with reference to FIG. 10 showing the flowchart of this process. In FIG. 10, the same step numbers as those of steps shown in FIG. 9 denote the same steps, and a description thereof will be omitted.

In step S1001, "the indices of tiles to which encoded data to be transmitted to the client terminal belong" held in the array Pt is rearranged in descending order of priority, and held in an array Pt'. Details of the process in step S1001 will be described later.

In step S1002, a variable "length" for counting the size of data stored as response data in the transmission buffer is initialized by substituting "0" in the variable "length". The above-described processes from step S901 to step S905 are executed.

Upon the completion of the processes from step S901 to step S905, the process advances to step S1003. It is determined in step S1003 whether packet data Packet (Pt'[n], Ly, Rs, Cp, Ps) with the layer number Ly, resolution level number Rs, component number Cp, and position number Ps for the tile index Pt'[n] is data to be sent back.

If YES in step S1003, the process advances to step S1004; if NO, to step S909. In the first embodiment, when the process in step S1003 is executed for the first time, Packet (Pt'[0]=0, Ly=0, Rs=0, Cp=0, Ps=0) is a determination target. However, the request data contains the description "need=r1, r2", and this description requests data other than acquired data of resolution level 0, as described above. Packet (Pt'[0]=0, Ly=0, Rs=0, Cp=0, Ps=0) is determined not to be return data, and the process advances to step S909.

When the counter is incremented to Packet (Pt'[0]=0, Ly=0, Rs=1, Cp=0, Ps=0), it is interpreted from the description "need=r1, r2" that this packet has not been acquired by the client terminal and is requested data. In step S1003, the packet is determined to be return data, and the process advances to step S1004.

In step S1004, a data length Plen of Packet (Pt'[n], Ly, Rs, Cp, Ps) is acquired. As a method of acquiring Plen, the data length Plen may be read from a file which describes the data length Plen of each packet, or read from a field which describes the data length Plen of each packet as metadata. Alternatively, the data length Plen of each packet may be obtained by actually analyzing the packet header.

In step S1005, a length MsgHlen of the message header 608 of Packet (Pt'[n], Ly, Rs, Cp, Ps) is acquired. The length MsgHlen can be easily acquired by deciding whether to contain, in response data, each of three elements of the message header 608:

Identifier which indicates that data is a precinct data-bin
Codestream number
Auxiliary information and calculating and adding elements to be actually contained and three elements of the message header 608:

PrID (Pt'[n], Rs, Cp, Ps)
PrOffset
Data length of ResLen.

In step S1006, the sum of the data length Plen acquired in step S1004 and the message header length MsgHlen acquired in step S1005 is compared with a value obtained by subtracting the size "length" of data which has already been written in the transmission buffer from the upper limit value byte_limit of the response data size that is acquired in step S805. That is, it is determined whether the data length held by the transmission buffer does not exceed the upper limit value byte_limit as a result of writing Packet (Pt'[n], Ly, Rs, Cp, Ps) as JPIP response data in the transmission buffer.

If (Plen+MsgHlen) is equal to or smaller than (byte_limit−length), the data length is determined not to exceed the upper limit value byte_limit even upon writing JPIP response data generated from Packet (Pt'[n], Ly, Rs, Cp, Ps) in the transmission buffer, and the process advances to step S1007. If (Plen+MsgHlen) is larger than (byte_limit−length), the data length is determined to exceed the upper limit value byte_limit upon writing JPIP response data generated from Packet (Pt'[n], Ly, Rs, Cp, Ps) in the transmission buffer. The process of FIG. 10 ends, and the process advances to step S807.

In step S1007, data of Packet (Pt'[n], Ly, Rs, Cp, Ps) is read out to the transmission buffer, and generates JPIP response data as shown in FIG. 6B.

In step S1008, the number (Plen+MsgHlen) of bytes of the JPIP response data written in the transmission buffer in step S1007 is added to the variable "length" for counting the data size of response data stored in the transmission buffer. The process advances to step S909, and the processes from step S909 to step S913 are executed.

By the above-described processes, the server 204 sends back data at scalability in the layer direction (image quality direction) in steps S804 and S806.

Figure 11:
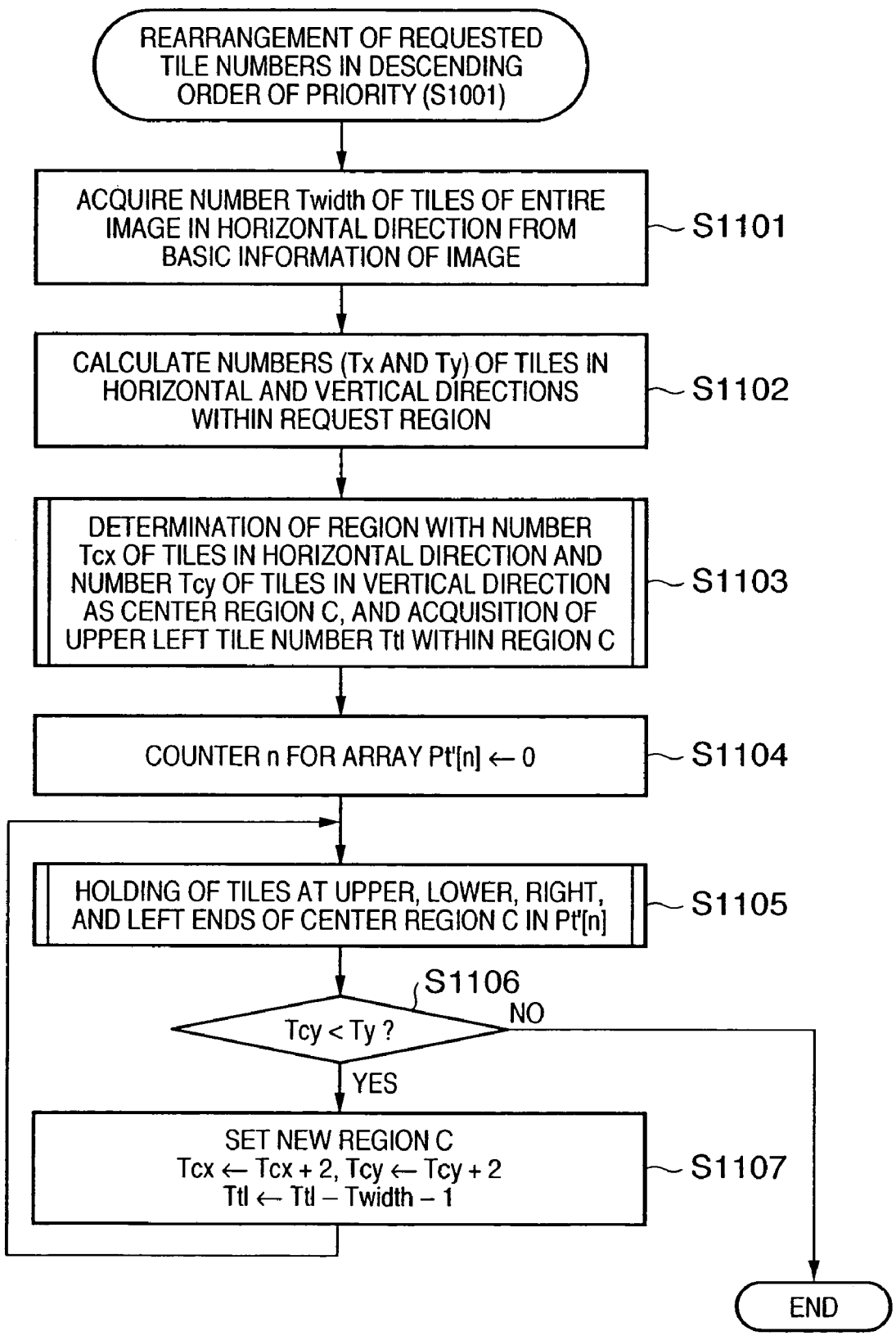
FIG. 11 is a flowchart showing details of a process in step S1001, i.e., a process of rearranging "the indices of tiles to which encoded data to be transmitted to the client terminal belong" held in an array Pt in descending order of priority, and holding the indices in an array Pt'.

Details of the process in step S1001, i.e., details of the process of rearranging "the indices of tiles to which encoded data to be transmitted to the client terminal belong" held in the array Pt in descending order of priority, and holding the indices in the array Pt' will be described with reference to FIG. 11 showing the process of this process.

In step S1101, a header contained in encoded image data is referred to, and "the number Twidth of tiles of the image in the horizontal direction" is acquired by referring to pieces of information written in the header. In the first embodiment, encoding conditions for encoded image data managed by the server 204 (saved in the storage device 205) are Image size at resolution level 2: 768 pixels×768 pixels
Tile size at resolution level 2: 128 pixels×128 pixels.

These pieces of encoding condition information are obtained by referring to the header information. "The number Twidth of tiles of the image in the horizontal direction" can be acquired by calculating Twidth=768/128=6.

In step S1102, the number Tx of tiles in the horizontal direction and the number Ty of tiles in the vertical direction within a region requested by the client terminal are obtained. These values can be easily obtained from the tile size attained from the JPEG2000 main header and the size of the request region attained as a result of analyzing request data. In the first embodiment, the description "fsiz=768,768 & roff=0,0 & rsiz=512,384" in the character string indicated by the request data reveals that the region 701 is requested as a request region. Tx and Ty can be obtained by calculating Tx=512/128=4 and Ty=384/128=3.

In step S1103, a center region C (the number Tcx of tiles in the horizontal direction and the number Tcy of tiles in the vertical direction) within the request region is determined, and an index (tile number) Ttl of a tile at the upper left corner of the determined center region C is acquired. Details of the method of determining the center region C will be described later with reference to FIG. 12.

In step S1104, the counter variable n representing the element number of the array Pt' is initialized by substituting "0" in the counter variable n.

In step S1105, the indices of outermost tiles in the center region C (i.e., tiles positioned at the upper, lower, right, and left ends of the center region C) are rearranged in ascending order, and held in the array Pt'[n]. Details of the process in step S1105 will be described with reference to FIG. 13.

In step S1106, the number Tcy of tiles in the vertical direction within the center region C and the number Ty of tiles in the vertical direction within the request region are compared with each other. If Tcy=Ty, the process of FIG. 11 ends, and the process advances to step S1002. That is, if Tcy=Ty, the size of the center region C having undergone processes to be described later can be determined to coincide with the size of the request region. Thus, the process of FIG. 11 ends, and the process advances to step S1002.

If Tcy and Ty exhibit different values, the process advances to step S1107. Since it can be determined that the size of the center region C having undergone processes to be described later is smaller than the size of the request region and a region to be processed remains, the process advances to step S1107.

In step S1107, the size of the center region C is enlarged by one tile at each of the upper, lower, right, and left ends by adding "2" to the number Tcx of tiles in the horizontal direction and the number Tcy of tiles in the vertical direction within the center region C. As the size of the center region C is updated, the index of the tile at the upper left corner of the center region C also changes. The index of the tile at the upper left corner of the center region C whose size has changed can be obtained by subtracting (Twidth+1) from the current index Ttl.

Figure 12:
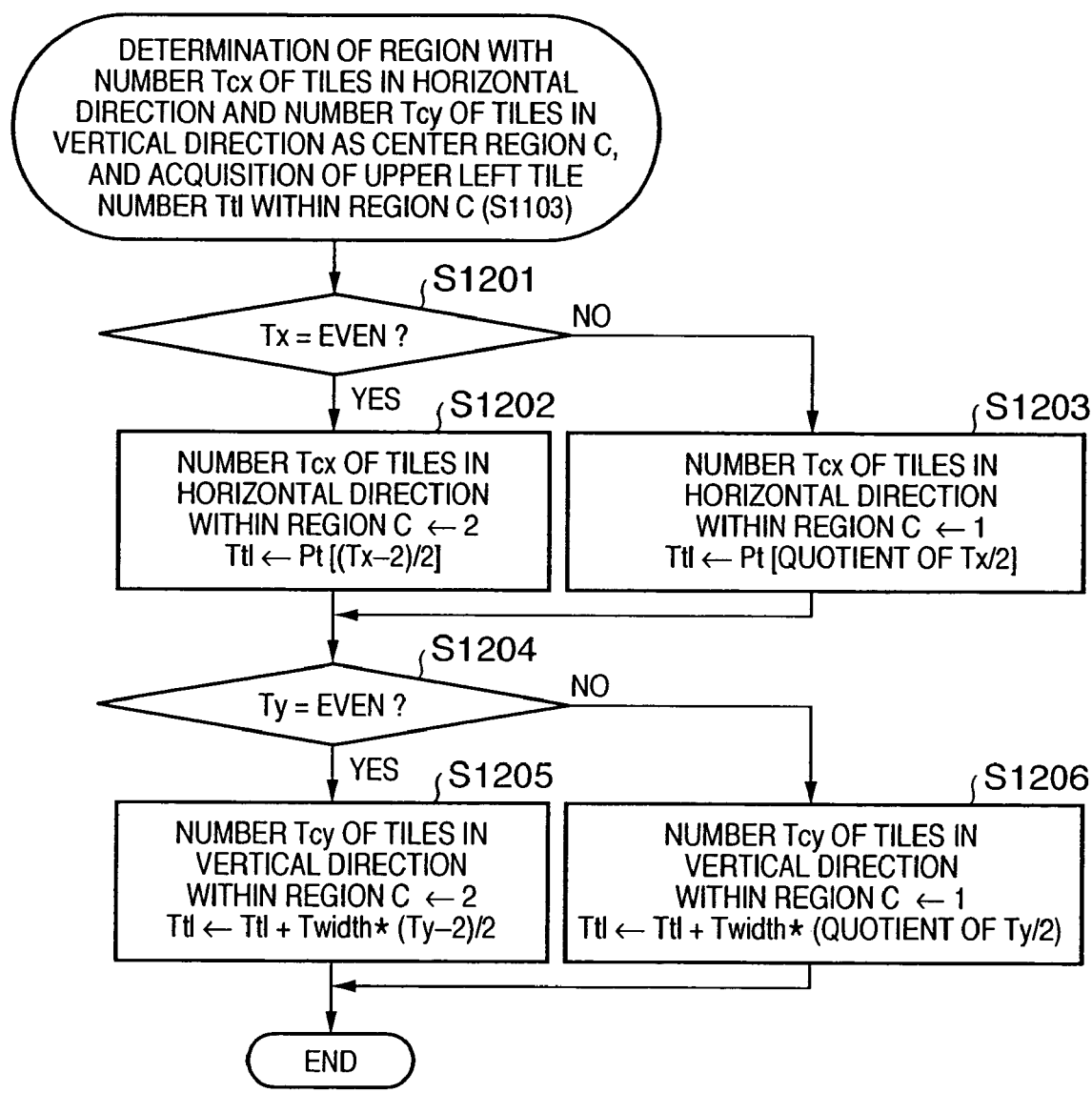
FIG. 12 is a flowchart showing details of a process of setting a center region C in a request region in step S1103.

Details of the process of setting the center region C within the request region in step S1103 will be explained with reference to FIG. 12 showing the detailed flowchart of this process.

It is determined in step S1201 whether the number Tx of tiles in the horizontal direction within the request region is even or odd. If the number Tx of tiles is even, the process advances to step S1202; if the number Tx of tiles is odd, to step S1203. If the number Tx of tiles in the horizontal direction is even, "2" is set as the number Tcx of tiles in the horizontal direction within a center region C to be set in step S1202, and Pt[(Tx−2)/2] is set as the index Ttl of the tile at the upper left corner of the center region C.

If Tx is odd, "1" is set as the number Tcx of tiles in the horizontal direction in a center region C to be set in step S1203, and Pt[quotient of Tx/2] is set as the index Ttl of the tile at the upper left corner of the center region C.

Figure 14A:
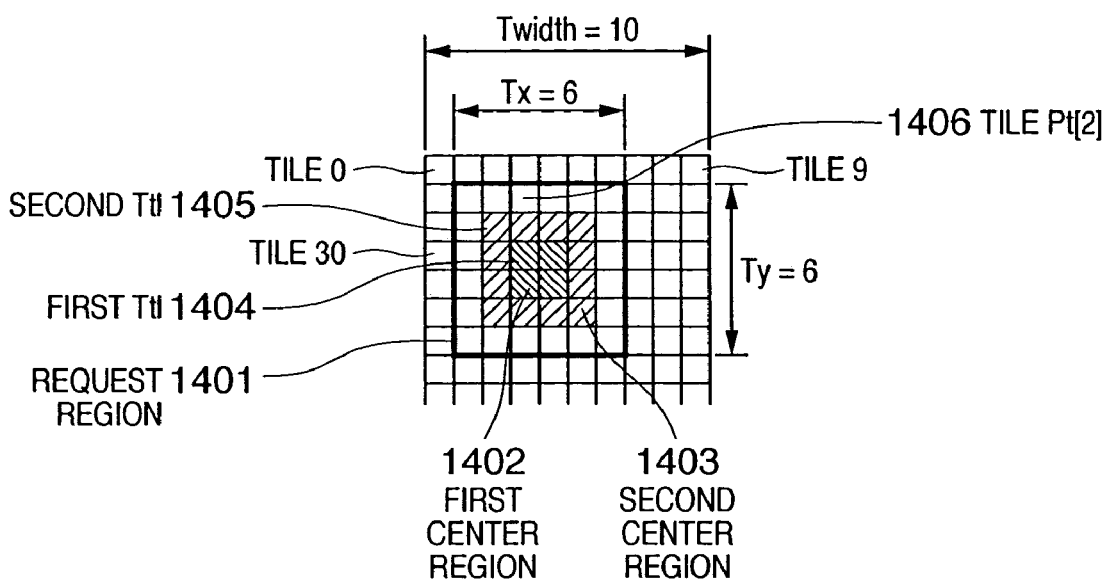
FIG. 14A is a view for explaining setting of the center region C.
Figure 14B:
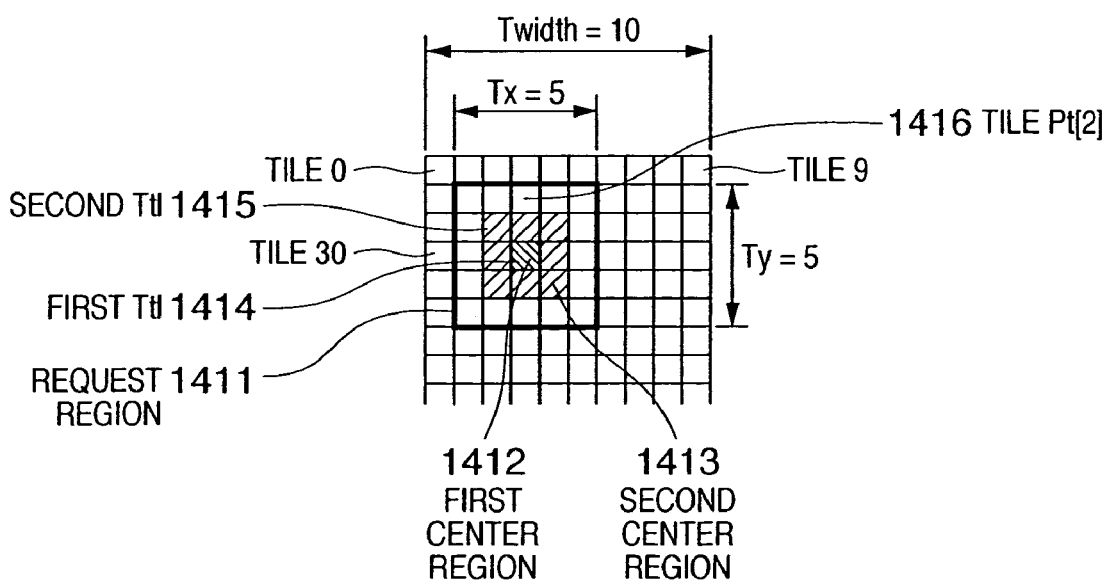
FIG. 14B is a view for explaining setting of the center region C.

FIGS. 14A and 14B are views for explaining setting of the center region C. More specifically, FIG. 14A is a view for explaining setting of the center region C when the numbers of tiles in the vertical and horizontal directions within the request region are even. FIG. 14B is a view for explaining setting of the center region C when the numbers of tiles in the vertical and horizontal directions within the request region are odd.

For example, when a region 1401 shown in FIG. 14A is a request region, the number Tx of tiles in the horizontal direction is an even number of 6. In the process according to the flowchart shown in FIG. 12, the process advances from step S1201 to step S1202. In step S1202, Tcx and Ttl are set to Tcx=2 and Ttl=Pt[(6−2)/2]=Pt[2], as described above. In FIG. 14A, Pt[2] indicates the index of a tile 1406.

For example, when a region 1411 shown in FIG. 14B is a request region, the number Tx of tiles in the horizontal direction is an odd number of 5. In the process according to the flowchart shown in FIG. 12, the process advances from step S1201 to step S1203. In step S1203, Tcx and Ttl are set to Tcx=1 and Ttl=Pt[quotient of 5/2]=Pt[2], as described above. In FIG. 14B, Pt[2] indicates the index of a tile 1416.

In this manner, in steps S1202 and S1203, the number of tiles in the horizontal direction within the center region C is set as Tcx regardless of whether the number Tx of tiles in the horizontal direction is even or odd. The index of a tile on the uppermost column and the same row as that of the tile at the upper left corner of the center region C is set as Ttl.

In the next process, the number of tiles in the vertical direction within the center region C is set as Tcy, and the index of a tile on the same row and column as those of the tile at the upper left corner of the center region C, i.e., the index of the tile at the upper left corner of the center region C is set as Ttl.

It is determined in step S1204 whether the number Ty of tiles in the vertical direction within the request region is even or odd. If the number Ty of tiles is even, the process advances to step S1205; if the number Ty of tiles is odd, to step S1206. If the number Ty of tiles in the vertical direction is even, "2" is set as the number Tcy of tiles in the vertical direction within the center region C in step S1205. The sum of adding Twidth×(Ty−2)/2 to the index Ttl set by the above process is newly set as the index Ttl of the tile at the upper left corner of the center region C. By the process in step S1205, the index of the tile at the upper left corner of the center region C is set as the index Ttl. Since the numbers of tiles in the horizontal and vertical directions within the center region C can be obtained by the above process, the process of FIG. 12 ends, and the process advances to step S1104.

If Ty is odd, "1" is set as the number Tcy of tiles in the vertical direction within a center region C to be set in step S1206. The sum of adding Twidth×(quotient of Ty/2) to the index Ttl set by the above process is newly set as the index Ttl of the tile at the upper left corner of the center region C. By the process in step S1206, the index of the tile at the upper left corner of the center region C is set as the index Ttl. Since the numbers of tiles in the horizontal and vertical directions within the center region C can be obtained by the above process, the process of FIG. 12 ends, and the process advances to step S1104.

The processes in steps S1204, S1205, and S1206 will be explained in more detail with reference to FIGS. 14A and 14B. For example, when the region 1401 shown in FIG. 14A is a request region, the number Ty of tiles in the vertical direction is an even number of 6. In the process according to the flowchart shown in FIG. 12, the process advances from step S1204 to step S1205. In step S1205, Tcy=2, and Ttl is the sum of 10×(6−2)/2=20 to the value Ttl obtained in step S1202, as described above. The index of a tile at a position 1404 lower by two columns from the Pt[2] position 1406 is set as Ttl.

For example, when the region 1411 shown in FIG. 14B is a request region, the number Ty of tiles in the vertical direction is an odd number of 5. In the process according to the flowchart shown in FIG. 12, the process advances from step S1204 to step S1206. In step S1206, Tcy=1, and Ttl is the sum of 10×(quotient of 5/2)=10×2=20 to the value Ttl obtained in step S1203, as described above. The index of a tile at a position 1414 lower by two columns from the Pt[2] position 1416 is set as Ttl.

In steps S1205 and S1206, the number of tiles in the vertical direction within the center region C is set as Tcy regardless of whether the number Ty of tiles in the vertical direction is even or odd. The index of the tile at the upper left corner of the center region C is set as Ttl.

In the first embodiment, since the request region is the region 701 shown in FIG. 7, Tcx, Tcy, and Ttl are respectively set to Tcx=2, Tcy=1, and Ttl=7 by the process according to the flowchart shown in FIG. 12.

The process according to the flowchart shown in FIG. 11 will be described in more detail with reference to FIGS. 14A and 14B. In FIG. 14A, a region 1402 is set as the center region C in the process of step S1103 (i.e., process according to the flowchart shown in FIG. 12). When the process in step S1107 is performed for the first time, the size of the region 1402 is enlarged by one tile at each of the upper, lower, right, and left ends in this step, as described above. A region 1403 in FIG. 14A can be newly obtained as the center region C by the process of step S1107.

As shown in FIG. 14A, "33" is set as the index. Ttl of the tile at the upper left corner of the center region C (1402). When the process in step S1107 is performed for the first time, the center region C is updated to the region 1403. The index Ttl of the tile at the upper left corner of the center region C after updating is changed to Ttl=33−10−1=22 from the above-mentioned calculation "Ttl=Ttl−(Twidth+1)". As a result, "22" is newly set as Ttl.

After the end of the process in step S1107, the process returns to step S1105. After the region 1403 is set as the center region C, the process returns to step S1105. When the process up to step S1106 is completed, Tcy=4≠Ty=6, and the process advances to step S1107 through the process in step S1106. The size of the center region C (1403) is enlarged by one tile at each of the upper, lower, right, and left ends, newly obtaining the request region 1401 in FIG. 14A as the center region C. The process then returns to step S1105. When the process advances to step S1106, Tcy=Ty=6, the process of FIG. 11 is determined to end, and the process advances to step S1002.

In the first embodiment, a region 703 is specified as the center region C which is set in the first process, and Tcx=2, Tcy=1, and Ttl=7 are calculated. The region 701 is then specified as the center region C which is set in the second process, and Tcx=4, Tcy=3, and Ttl=0 are calculated. That is, the center region C which is set in the second process overlaps the request region.

Figure 13:
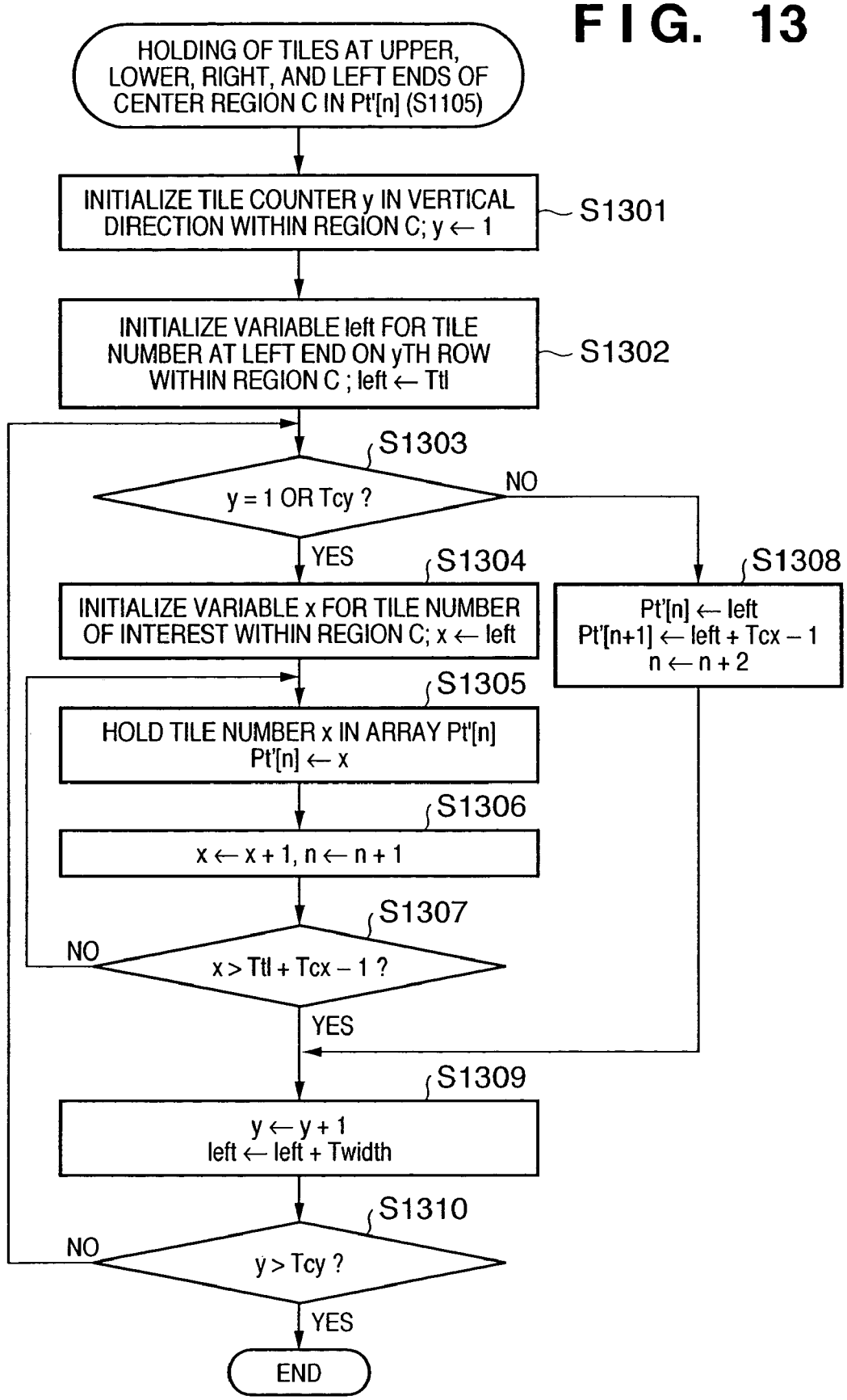
FIG. 13 is a flowchart showing a process in step S1105.

Details of the process in step S1105 will be explained with reference to FIG. 13 showing the flowchart of this process.

In step S1301, a variable (counter) y for counting the number of tiles in the vertical direction within the center region C is initialized by substituting "1" in the variable y. The possible value of the variable y ranges from 1 (uppermost row) to Tcy (lowermost row).

In step S1302, a variable "left" for storing the index of a tile at the left end on the yth row from the top of the center region C is initialized by substituting the value of the variable Ttl in the variable "left". Since y=1 in step S1302, the index Ttl of the tile at the left end on the first row, i.e., at the upper left corner of the center region C is substituted as an initial value into the variable "left".

In step S1303, the value of the variable y within the center region C is checked, and if y is 1 or Tcy, the process advances to step S1304; if y takes another value, to step S1308. That is, if the current tile of interest is positioned on the uppermost or lowermost row of the center region C in this process, the process advances to step S1304; otherwise, to step S1308.

If the process advances from step S1302 to step S1303, y=1 and the process advances to step S1304.

In step S1304, a variable x representing the index of a tile of interest within the center region C is initialized by substituting the value of the variable "left" in the variable x. In step S1305, the value of the variable x is held in the array Pt'[n]. In step S1306, "1" is added to the index x of the tile of interest to shift the tile of interest by one to the right. Furthermore, the variable n for counting the elements of the array Pt' is incremented by one.

In step S1307, the value of the variable x and the value (Ttl+Tcx−1) are compared, and if x>(Ttl+Tcx−1), the process advances to step S1309; if x=(Ttl+Tcx−1), the process returns to step S1305. That is, the processes in steps S1305 and S1306 are repeated until the indices of tiles on one row are substituted in the array Pt'.

In step S1309, the value of the variable y is incremented by one to shift the row of interest in the center region C to a row lower by one. Since the variable y representing the row of interest has changed, the value held by the variable "left" is updated by adding the number Twidth of tiles corresponding to the width of the entire image to the value of the variable "left" representing the number of the tile at the left end on the yth row.

In step S1310, the variable y and the number Tcy of tiles in the vertical direction within the center region C are compared, and if y>Tcy, i.e., the indices of tiles on all the rows have been substituted in the array Pt', the process of FIG. 13 ends, and the process advances to step S1106.

If y≦Tcy, i.e., the indices of tiles on all the rows have not been substituted in the array Pt' yet, the process returns to step S1303 to repeat the subsequent processes.

If "y=1 or y=Tcy" does not hold in step S1303, the above-mentioned process advances to step S1308. In step S1308, the variable "left" is substituted in the array Pt'[n], the value (left+Tcx−1) is substituted in Pt'[n+1], "2" is added to n, and the process advances to step S1309. In other words, the index of a tile at the left end of a row of interest in the center region C is substituted in the array Pt'[n], and the index of a tile at the right end of the row of interest in the center region C is substituted in Pt'[n+1].

By the process according to the flowchart of FIG. 13, the indices of tiles in the center region C are sequentially held in the array Pt'[n] from left to right and top to bottom. At this time, only the indices of outermost tiles in the center region C are held in Pt'[n]. Since the first center region C 1402 falls within the second center region C 1403, as shown in FIG. 14A, inner tiles have already been held in the array Pt'[n]. For this reason, only the indices of outer tiles in each subsequent center region C are held in Pt'[n].

In the first embodiment, indices "7 and 8" of tiles in the first region C (703) of interest are substituted in the arrays Pt'[0] and Pt'[1]. Indices "0, 1, 2, 3, 6, 9, 12, 13, 14, and 15" of tiles in the second region C (701) of interest are substituted in the array Pt'[n]. The array Pt'[n] finally holds Pt'[0]=7, Pt'[1]=8,
Pt'[2]=0, Pt'[3]=1, Pt'[4]=2, Pt'[5]=3
Pt'[6]=6, Pt'[7]=9,
Pt'[8]=12, Pt'[9]=13, Pt'[10]=14, Pt'[11]=15

Figures 15A, 15B:
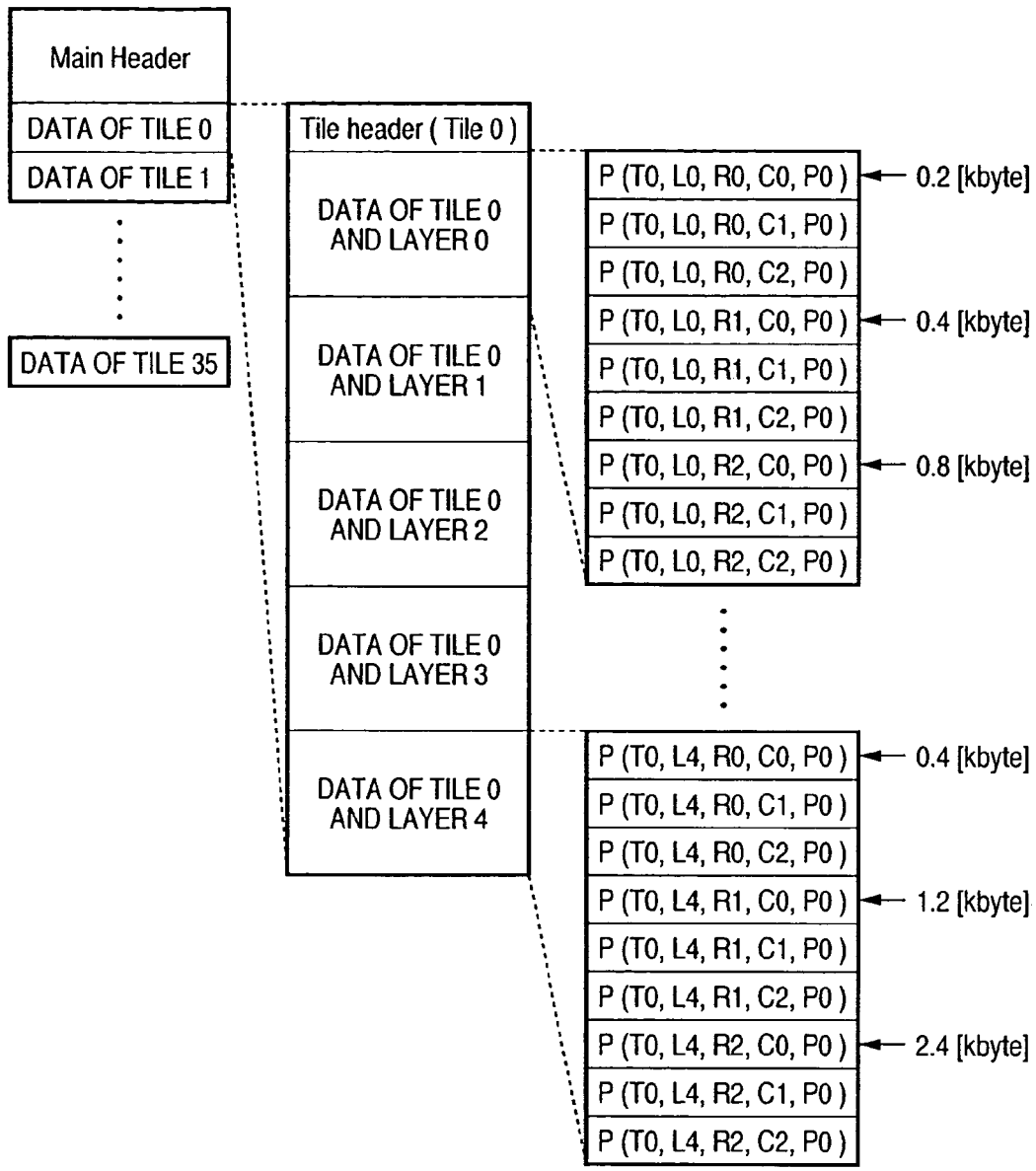
FIG. 15A is a view showing an example of the data size of encoded data.
FIG. 15B is a table showing the example of the data size of encoded data.

When encoded image data of a data size as shown in FIGS. 15A and 15B is managed by the server 204 (saved in the storage device 205), response data obtained when the server 204 sends back data in the tile index order within the request region at scalability in the layer direction upon reception of the above-described request data, and response data obtained when the server 204 rearranges the indices of tiles sequentially from the center within the request region and sends back data in the rearranged index order at scalability in the layer direction are compared. In order to simplify calculation, data sizes upon adding message headers to packets of respective layers and resolution levels for all tiles and components comply with those shown in the table of FIG. 15B.

In sending back data at scalability in the layer direction, the data size of 12 tiles of each layer at resolution level 1 and resolution level 2 is layer 0: (0.4+0.8)×3 components×12 tiles=43.2 [kbytes]
layer 1: (0.6+1.2)×3 components×12 tiles=64.8 [kbytes]
layer 2: (0.8+1.6)×3 components×12 tiles=86.4 [kbytes]
layer 3: (1.0+2.0)×3 components×12 tiles=108.0 [kbytes]
layer 4: (1.2+2.4)×3 components×12 tiles=129.6 [kbytes].

The data sizes of layers 0 to 3 are added to obtain
43.2+64.8+86.4+108.0=302.4 [kbytes]

The sum is smaller than 360 [kbytes] which is the upper limit value of response data, and thus data of layers 0 to 3 can be contained in the response data.

Also, data of layer 4 is contained in the response data. However, the upper limit value of the response data size is 360 [kbytes], and data of layer 4 can be contained in the response data by only 360.0−302.4=57.6 [kbytes].

Since the data size of layer 4 and resolution level 1 is 1.2×3 components×12 tiles=43.2 [kbytes], data of layer 4 and resolution level 1 can be contained in the response data. As a result of containing data of layers 0 to 3 and data of layer 4 and resolution level 1 in the response data, the data size still containable in the response data is 360.0−302.4−43.2=14.4 [kbytes]. A field of 14.4 [kbytes] can contain data of two tiles of layer 4 and resolution level 2 (2.4×3 components×2 tiles=14.4 [kbytes]). The two tiles are selected from the head (head when viewed from a tile closer to the center within the request region) when tiles are referred to in order in which the indices of tiles are rearranged from the center within the request region.

FIG. 21 is a table showing the configuration of this response data. As shown in FIG. 21, the response data can finally contain data of layers 0 to 3, data of layer 4 and resolution level 1, and data of two tiles of layer 4 and resolution level 2.

When the server 204 sends back data at scalability in the layer direction in the tile index order within the request region, return tiles of resolution level 2 and layer 4 are upper left tiles 0 and 1 within the request region. To the contrary, the first embodiment rearranges the indices of tiles sequentially from the center within the request region, and sends back data at scalability in the layer direction in the rearranged index order. Return tiles of resolution level 2 and layer 4 are central tiles 7 and 8 in the request region. Return tiles of resolution level 2 and layer 4 in these cases are shown in FIGS. 16A and 16B.

FIG. 16A is a view showing return tiles of resolution level 2 and layer 4 in transmitting tile data sequentially from an upper left tile in the request region. As described above, these return tiles are tiles 0 and 1. FIG. 16B is a view showing return tiles of resolution level 2 and layer 4 in transmitting tile data by the method according to the first embodiment. These return tiles are two tiles 7 and 8 in the center region C.

In many cases, the portion of interest in an image for the user is the central portion of the image. When the number of transmittable tiles is limited due to the upper limit value of the data size, tiles closer to the central portion have higher priority of transmission. This also applies to a case in which the request region is designated, and the interest level of the user is higher for the central portion of the request region.

The first embodiment takes this background into consideration, and data of tiles at the central portion of the entire image or request region are contained in response data in larger quantities for high image quality.

A larger part of a limited response data size can be assigned to data at the central portion of the request region than to data at the peripheral portion. This allows reproducing the central portion at higher image quality.

This assignment is adjusted at only a portion of the highest image quality. While a designated response data size is exploited at maximum, the possibility at which the image quality or resolution may excessively change within the request region can be suppressed, providing a more natural image.

The process according to the first embodiment can be executed even if no request region is designated (or the entire image is designated). In this case, the entire image is regarded as the request region, and response data which is higher in image quality at the central portion of the image and has a size equal to or smaller than a designated data size can be generated.

[Second Embodiment]

In the first embodiment, the tile transmission order is determined using only request data received from the client terminal. However, when some tiles contained in the request region are assigned metadata, the tile transmission order may be determined on the basis of the metadata. In this case, the second embodiment is different from the first embodiment in step S1001 of arranging the indices of tiles in FIG. 10.

Figure 17:
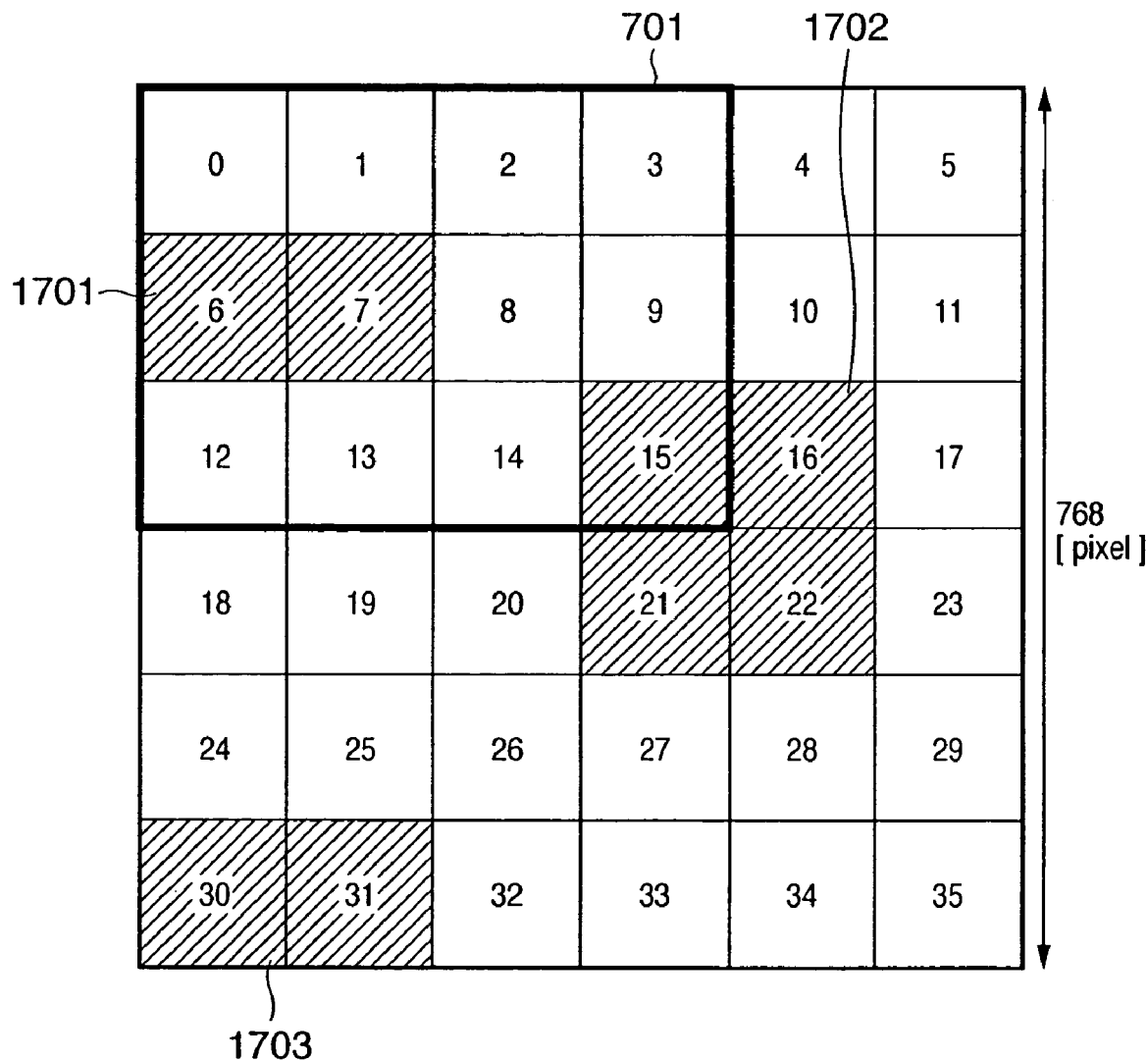
FIG. 17 is a view for explaining data of a metadata-assigned tile.

The second embodiment assumes that metadata are assigned to eight tiles with indices of 6, 7, 15, 16, 21, 22, 30, and 31, as shown in FIG. 17. A process of determining the tile transmission order in this case will be explained.

These tiles fall within three metadata-assigned regions 1701, 1702, and 1703. The metadata-assigned region 1701 contains tiles 6 and 7, and completely falls within a request region 701. The metadata-assigned region 1702 contains tiles 15, 16, 21, and 22, and partially overlaps the request region 701. The metadata-assigned region 1703 contains tiles 30 and 31, and does not overlap the request region 701 at all.

A tile index rearrangement process executed in step S1001 in this case will be described with reference to FIG. 18 showing the flowchart of this process.

In step S1801, the indices of tiles which form a metadata-assigned region completely falling within the request region out of regions (metadata-assigned regions) of an image that are assigned metadata, i.e., regions that are formed from metadata-assigned tiles are held in Pt'.

More specifically, adjacent "metadata-assigned tiles" are assembled and managed as one metadata-assigned region. Whether the indices of all tiles which form the metadata-assigned region are held in the array Pt is determined for each managed metadata-assigned region by referring to the array Pt which holds the indices of tiles of the region 701. If all the indices are held, the metadata-assigned region can be determined to completely fall within the region 701.

In this way, the indices of tiles which form the metadata-assigned region completely falling within the region 701 are held in the array Pt' in step S1801. In the example shown in FIG. 17, only the indices of tiles which form the region 1701 are held in the array Pt' in step S1801. In this case, Pt'[0]=6 and Pt'[1]=7 in step S1801.

In step S1802, the indices of tiles contained in the request region out of tiles in a metadata-assigned region which partially overlaps the request region are held in the array Pt' subsequently to the data held in step S1801.

More specifically, whether one or more indices of tiles which form a metadata-assigned region are held in the array Pt is determined for each managed metadata-assigned region by referring to the array Pt which holds the indices of tiles of the region 701. If one or more indices are held, the metadata-assigned region can be determined to partially overlap the region 701.

Accordingly, in step S1802, the indices of tiles which form the metadata-assigned region partially overlapping the region 701 are held in the array Pt'. In the example shown in FIG. 17, only an index "15" of a tile out of tiles which form the region 1702 is held in the array Pt' in step S1802. In this case, Pt'[2]=in step S1802.

In step S1803, the indices held in the array Pt and the indices held in the array Pt' in steps S1801 and S1802 are compared. Indices which have not been held in the array Pt' are held in it in the index order, and the process ends. Upon the completion of the process according to the flowchart shown in FIG. 18, the array Pt' sequentially holds the following data:

Pt'[0]=6, Pt'[1]=7, Pt'[2]=15,
Pt'[3]=0, Pt'[4]=1, Pt'[5]=2, Pt'[6]=3,
Pt'[7]=8, Pt'[8]=9,
Pt'[9]=12, Pt'[10]=13, Pt'[11]=14.

Note that the second embodiment can adopt any metadata-assigned region specifying method. For example, when metadata is assigned to a partial region of an image in XML as described in ISO/IEC15444-2 Annex N, the metadata-assigned region can be specified by analyzing the position element of each metadata from a portion of the image file that is described in XML.

In addition, various methods of specifying a metadata-assigned partial region are conceivable in accordance with the metadata assignment method. An optimal specifying method changes depending on each metadata assignment method, and a description thereof will be omitted.

When encoded image data of a data size as shown in FIGS. 15A and 15B is managed by a server 204 (saved in a storage device 205), tile numbers are rearranged in order from tiles contained in a metadata-assigned region within the request region, like the second embodiment. When the resultant data are sent back at scalability in the layer direction, return tiles of resolution level 2 and layer 4 are tiles 6 and 7 of the metadata-assigned region 701. FIG. 16C shows return tiles of resolution level 2 and layer 4 in the second embodiment.

FIG. 16C is a view showing return tiles of resolution level 2 and layer 4 in transmitting tile data by the method according to the second embodiment. These return tiles are tiles 6 and 7.

In general, a metadata-assigned region is a significant or important region in an image. Since the tile order for transmitting data is defined by the above method, data of a region regarded as a relatively important one can be sent back in larger quantities than the remaining region even if the data size of response data is limited.

Even a metadata-assigned region of one layer can achieve a higher image quality than the remaining region, and effects such as the ROI can be easily expected without using encoding of specially setting ROI. The ROI effect eliminates the need for re-encoding. To present the ROI to the client terminal at an intentionally higher image quality than the remaining region, the region to be presented to the client terminal can be very easily controlled only by changing the metadata-assigned region.

[Third Embodiment]

In the second embodiment, the data transmission order is determined on the basis of information on whether metadata exists. Alternatively, the data transmission order may be determined on the basis of information on whether an encrypted portion exists.

An important region is generally considered to have been encrypted, and data of the encrypted region is sent back as much as possible. In this case, the same flow as that of FIG. 18 can be applied by replacing a metadata-assigned region in steps of FIG. 18 with an encrypted region.

To the contrary, when data of an encrypted region is not left on the client side as much as possible, data of an unencrypted region is sent back as much as possible. In this case, the same flow as that of FIG. 18 can be applied by replacing a metadata-assigned region in steps of FIG. 18 with an unencrypted region.

These two flows may be switched on the basis of whether the client terminal can utilize a decryption key. That is, a transmission order which gives priority to an encrypted region is set for a client terminal which can utilize the decryption key, whereas a transmission order which gives priority to an unencrypted region is set for a client terminal which cannot utilize any decryption key.

An encrypted region can be specified by various methods: a method of specifying an encrypted region on the basis of information assigned to an image file, a method of specifying an encrypted region by actually analyzing a bitstream, a method of specifying an encrypted region on the basis of information saved in another file, or a method of obtaining information from a third party such as an authentication server. However, specification of an encrypted region is not a main point of the present invention, and a detailed description thereof will be omitted.

By the method according to the third embodiment described above, the server can determine the transmission order of tiles within the request region on the basis of encrypted information. The intension of the user who performs an encryption process can also be easily reflected in data transmission. A combination with information on the right to utilize the decryption key by the client terminal can provide a data distribution method corresponding to each client terminal.

[Fourth Embodiment]

The data transmission order is determined from only the request region of the client terminal in the first embodiment and the bitstream or file information of an image in the second and third embodiments. It is also possible to save the access count of each partial region in the server, and determine the data transmission order on the basis of the statistic. In this case, the fourth embodiment is different from the first embodiment in the step S1001 of arranging the indices of tiles in FIG. 10.

In the fourth embodiment, as shown in FIG. 19A, the access count of each tile is managed in a table. Data of the table is saved in a secondary memory 103, and loaded to a primary memory 102, as needed. A process of determining the tile transmission order in this case will be explained.

Figure 20:
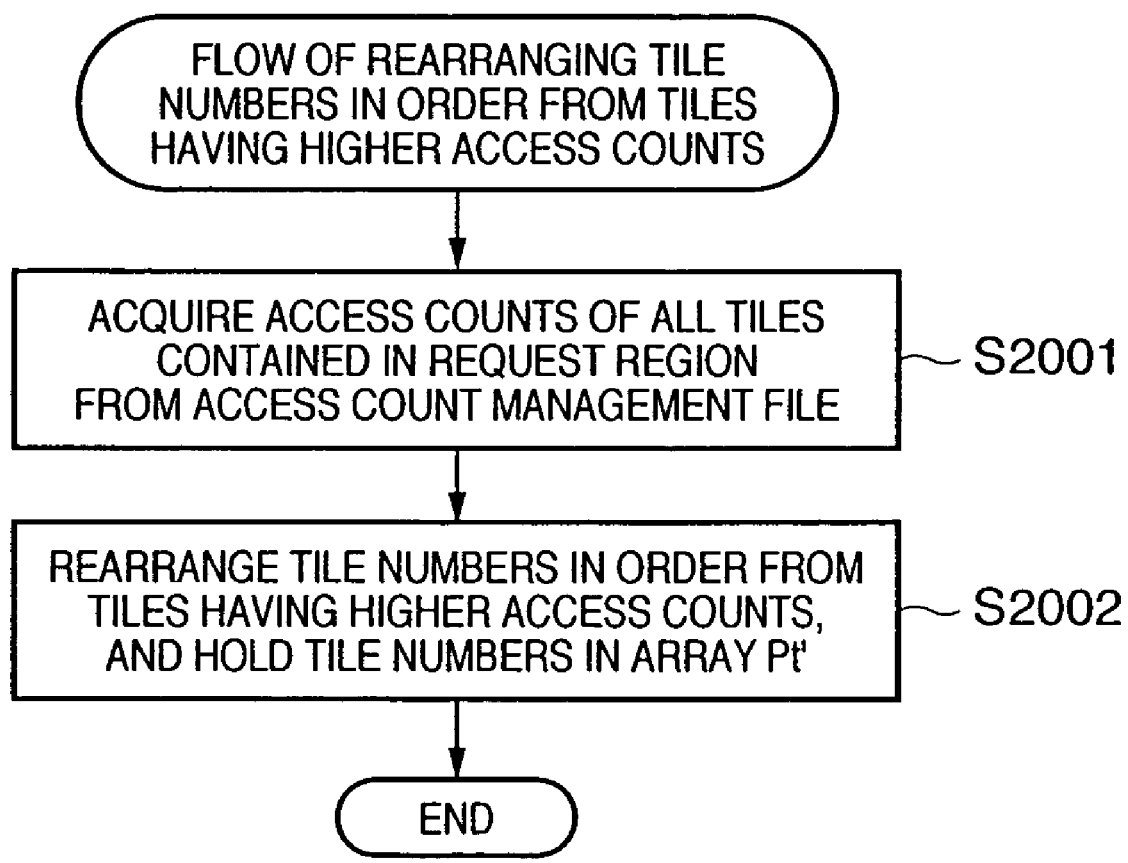
FIG. 20 is a flowchart showing a tile index rearrangement process executed in step S1001 in the fourth embodiment of the present invention.

In the fourth embodiment, tile indices are rearranged in order from tiles having higher access counts. In order to explain this process in more detail, a tile index rearrangement process executed in step S1001 according to the fourth embodiment will be described with reference to FIG. 20 showing the flowchart of this process.

In step S2001, the access counts of all tiles contained in the request region, i.e., specified by indices held in the array Pt are acquired by looking up a table 1901 shown in FIG. 19A. FIG. 19B shows the acquired access count data when the request region is a region 701 shown in FIG. 7.

As shown in FIG. 19B, access count data for 12 tiles with indices of 0, 1, 2, 3, 6, 7, 8, 9, 12, 13, 14, and 15 are acquired when the request region is a region 701 shown in FIG. 7. The acquired access count data are temporarily stored in the primary memory 102.

In step S2002, the indices are rearranged in order from tiles having higher access counts by referring to the access counts acquired in step S2001. The rearranged indices are held in the array Pt', and the process ends. As a method of rearranging data in descending order of access count, various methods such as bubble sort, quick sort, and heap sort can be employed. However, this method is not a main point of the present invention, and a description thereof will be omitted. In the fourth embodiment, the access count of each tile in the region 701 is expressed by a numerical value shown in FIG. 19B. Upon the completion of the process according to the flowchart shown in FIG. 20, the array Pt' holds the following values:

Pt'[0]=8, Pt'[1]=9, Pt'[2]=14, Pt'[3]=15
Pt'[4]=7, Pt'[5]=13, Pt'[6]=2, Pt'[7]=3
Pt'[8]=1, Pt'[9]=6, Pt'[10]=12, Pt'[11]=0.

In the fourth embodiment, as for tiles having the same access count, a tile having a smaller index is held first in the array Pt'.

When tile numbers are rearranged in descending order of access count in the request region, like the fourth embodiment, and the resultant data are sent back at scalability in the layer direction, return tiles of resolution level 4 and layer 2 are upper two tiles 8 and 9 having the highest access count in the region 701.

FIG. 16D shows return tiles of resolution level 2 and layer 4 in the fourth embodiment.

As the access counting method, the access count managed by the server may be counted up for each tile which is requested by the client terminal as a result of the analysis process in step S802. When the requested tile is determined in step S802, the server executes an arithmetic process (count-up process):

tileCount[Pt[n]]=tileCount[Pt[n]]+1 where tileCount [Pt[n]] is the access count of a tile Pt[n].

In general, a region having a high access count is a significant or important region in an image. Since the tile order for transmitting data is defined by the above method, data of a region regarded as a region important to the user can be sent back in larger quantities than the remaining region even if the data size of response data is limited.

The data transmission order may be determined using the statistic of the previous day or past few days, instead of merely accumulating the access count. In this case, even if the user's taste gradually changes and the access count changes, the transmission order can be easily automatically changed in accordance with the change in taste.

Although the above access counting method does not perform weighting corresponding to a requested layer, the access count can be counted up only in response to a request to the highest layer. The count-up process is executed if the client requests the highest layer, and is not executed if the client does not request the highest layer. According to this access counting method, only an access to the highest image quality is determined as an important access, and data of the region accessed at the highest image quality can be sent back in large quantities than the remaining region.

In the above embodiments, one tile corresponds to one position, and the data return order is determined on the basis of the tile. When the entire image is defined as one tile, i.e., the image is not segmented into tiles and is segmented by only the JPEG2000 position, the data return order may be determined on the basis of the position. When the entire image is segmented into tiles and each tile is segmented into positions, the data transmission order may be determined for respective positions.

According to the above embodiments, even when the data size of response data is limited, data of an important region that is determined on the server side to be sent back as much as possible can be sent back much more by one layer than data of the remaining region.

Since the image quality is not greatly different between the important region and the peripheral region, a sense of incongruence can be reduced.

If JPEG200 data which is encoded independently for each tile, each resolution level, and each layer is employed, the data need not be encoded again after determining the transmission order on the server side. This can reduce the burden on the server side along with control of the transmission order. Moreover, data can dynamically cope with various requests for the resolution, image quality, partial region, and component without encoding the data again.

The server intentionally limits the transmission data size within a data size limitation requested by the client terminal, and sends the data at layer-resolution scalability. It is therefore unlikely that only part of an image will be unnaturally displayed at a high definition on the client terminal side.

[Other Embodiment]

The object of the present invention is also achieved when a recording medium (or storage medium) which records software program codes for realizing the functions of the above-described embodiments is supplied to a system or apparatus, and the computer (or the CPU or MPU) of the system or apparatus reads out and executes the program codes recorded on the recording medium. In this case, the program codes read out from the recording medium realize the functions of the above-described embodiments, and the recording medium which records the program codes constitutes the present invention.

The functions of the above-described embodiments are realized when the computer executes the readout program codes. Also, the functions of the above-described embodiments are realized when an OS (Operating System) or the like running on the computer performs some or all of actual processes on the basis of the instructions of the program codes.

Furthermore, the present invention includes a case in which, after the program codes read out from the recording medium are written in the memory of a function expansion card inserted into the computer or the memory of a function expansion unit connected to the computer, the CPU of the function expansion card or function expansion unit performs some or all of actual processes on the basis of the instructions of the program codes and thereby realizes the functions of the above-described embodiments.

When the present invention is applied to the recording medium, the recording medium records program codes corresponding to the above-described flowcharts.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2003-343570 filed on Oct. 1, 2003 and Japanese Patent Application No. 2004-269129, filed on Sep. 16, 2004, which are hereby incorporated by reference herein.

What is claimed is:

1. An image processing method executed by an image processing apparatus which holds encoded data of an image that is segmented into tiles each formed from a plurality of logical units and can take a plurality of logical unit arrangement orders as a format of the encoded data, and transmits, to an external apparatus, data of a logical unit corresponding to a request from the external apparatus in a tile corresponding to the request, comprising:

a reception step of receiving a transmission request for encoded data necessary to obtain a desired image;

a determination step of determining whether an upper limit value of a data quantity of encoded data of a tile to be transmitted to the external apparatus in response to the transmission request is designated by the external apparatus; and a transmission control step of deciding, in accordance with a determination result in the determination step, a portion to be transmitted to the external apparatus out of data of logical units which form encoded data of tiles to be transmitted to the external apparatus and header data of the logical units, and transmitting the decided portion to the external apparatus, the transmission control step comprising a first transmission step of, when no upper limit value is designated, transmitting, to the external apparatus, data of logical units which form the encoded data of the tiles to be transmitted to the external apparatus and header data of the logical units, an output step of, when the upper limit value is designated, referring in a desired tile order to the encoded data of the tiles to be transmitted to the external apparatus, and outputting data of a logical unit corresponding to the transmission request and header data of the logical unit, of data of logical units which form encoded data of a tile to be referred to, to a memory and a second transmission step of counting a size of data of logical units and a size of header data of the logical units in an output order in the output step, and transmitting, to the external apparatus, a data group of the logical units and a header data group of the logical units which are output to the memory until a counting result exceeds the upper limit value.

2. The method according to claim 1, wherein in the determination step, whether data which designates an upper limit value of a data quantity of encoded data requested by the external apparatus is contained in a data group representing the transmission request from the external apparatus is determined, and when the data is contained, a numerical value represented by the data is interpreted as the upper limit value.

3. The method according to claim 1, wherein in the output step, encoded data of tiles to be transmitted to the external apparatus are referred to sequentially from a tile closer to a central position of the desired image, and of data of logical units which form encoded data of a tile to be referred to, data of a logical unit corresponding to the transmission request and header data of the logical unit are output to the memory.

4. The method according to claim 1, wherein in the output step, encoded data of tiles to be transmitted to the external apparatus are referred to in order from encoded data of a metadata-assigned tile to encoded data of a tile assigned no metadata, and of data of logical units which form encoded data of a tile to be referred to, data of a logical unit corresponding to the transmission request and header data of the logical unit are output to the memory.

5. The method according to claim 4, wherein in the output step, encoded data of tiles to be transmitted to the external apparatus are referred to in order from encoded data of a tile which forms a region completely falling within the desired image out of regions formed from metadata-assigned tiles, encoded data of a tile at a portion overlapping the region, and encoded data of a tile assigned no metadata, and of data of logical units which form encoded data of a tile to be referred to, data of a logical unit corresponding to the transmission request and header data of the logical unit are output to the memory.

6. The method according to claim 1, wherein in the output step, encoded data of tiles to be transmitted to the external apparatus are referred to in order from encoded data of an encrypted tile to encoded data of an unencrypted tile, and of data of logical units which form encoded data of a tile to be referred to, data of a logical unit corresponding to the transmission request and header data of the logical unit are output to the memory.

7. The method according to claim 1, wherein in the output step, encoded data of tiles to be transmitted to the external apparatus are referred to in order from encoded data of an unencrypted tile to encoded data of an encrypted tile, and of data of logical units which form encoded data of a tile to be referred to, data of a logical unit corresponding to the transmission request and header data of the logical unit are output to the memory.

8. The method according to claim 1, further comprising a management step of managing an access count from the external apparatus for each tile, wherein in the output step, encoded data of tiles to be transmitted to the external apparatus are referred to in descending order of access count, and of data of logical units which form encoded data of a tile to be referred to, data of a logical unit corresponding to the transmission request and header data of the logical unit are output to the memory.

9. The method according to claim 1, wherein the desired image includes part or all of an image.

10. The method according to claim 1, wherein the logical unit includes a packet, and the packet is formed from encoded data of a code block and a packet header which manages information on the code block.

11. An image processing apparatus which holds encoded data of an image that is segmented into tiles each formed from a plurality of logical units and can take a plurality of logical unit arrangement orders as a format of the encoded data, and transmits, to an external apparatus, data of a logical unit corresponding to a request from the external apparatus in a tile corresponding to the request, comprising:

reception means for receiving a transmission request for encoded data necessary to obtain a desired image;

determination means for determining whether an upper limit value of a data quantity of encoded data of a tile to be transmitted to the external apparatus in response to the transmission request is designated by the external apparatus; and transmission control means for deciding, in accordance with a determination result of said determination means, a portion to be transmitted to the external apparatus out of data of logical units which form encoded data of tiles to be transmitted to the external apparatus and header data of the logical units, and transmitting the decided portion to the external apparatus, said transmission control means comprising first transmission means for, when no upper limit value is designated, transmitting, to the external apparatus, data of logical units which form the encoded data of the tiles to be transmitted to the external apparatus and header data of the logical units, output means for, when the upper limit value is designated, referring in a desired tile order to the encoded data of the tiles to be transmitted to the external apparatus, and outputting data of a logical unit corresponding to the transmission request and header data of the logical unit, of data of logical units which form encoded data of a tile to be referred to, to a memory and second transmission means for counting a size of data of logical units and a size of header data of the logical units in an output order of said output means, and transmitting, to the external apparatus, a data group of logical units and a header data group of the logical units which are output to the memory until a counting result exceeds the upper limit value.

12. A program causing a computer to execute an image processing method defined in claim 1.

13. A computer-readable storage medium storing a program defined in claim 12.

* * * * *